(12) United States Patent  (10) Patent No.: US 8,763,314 B2
Yoo  (45) Date of Patent: Jul. 1, 2014

(54) CONTAINER-TYPE SYSTEM BOOTH FOR AN INDOOR/OUTDOOR EXHIBITION OR EVENT

(76) Inventor: Seung Hyeup Yoo, Seoul (KR)

( * ) Notice: Subject to any disclaimer, the term of this patent is extended or adjusted under 35 U.S.C. 154(b) by 0 days.

(21) Appl. No.: 13/823,400

(22) PCT Filed: Jul. 12, 2011

(86) PCT No.: PCT/KR2011/005116
§ 371 (c)(1), (2), (4) Date: Mar. 14, 2013

(87) PCT Pub. No.: WO2012/039543
PCT Pub. Date: Mar. 29, 2012

(65) Prior Publication Data
US 2013/0180182 A1  Jul. 18, 2013

(30) Foreign Application Priority Data
Sep. 20, 2010 (KR) .................. 10-2010-0092273

(51) Int. Cl.
*E04H 14/00* (2006.01)
*E04B 1/348* (2006.01)
*E04B 1/24* (2006.01)
(52) U.S. Cl.
CPC .. *E04B 1/348* (2013.01); *E04B 1/24* (2013.01)
USPC ........................................ 52/79.2; 52/236.3
(58) Field of Classification Search
USPC ......... 52/6, 7, 8, 9, 10, 79.1, 79.2, 79.3, 79.4, 52/79.5, 79.9, 79.12, 79.13, 234, 236.3, 52/236.4, 236.9, 106; 40/600; D25/62, 63, D25/64, 66, 69; 182/83, 84, 85, 93
See application file for complete search history.

(56) References Cited

U.S. PATENT DOCUMENTS

| 4,028,827 | A | * | 6/1977 | Hufton ............................ 40/600 |
| 4,386,487 | A | * | 6/1983 | Scott ............................... 52/184 |
| 4,432,171 | A | * | 2/1984 | Boot ............................... 52/79.1 |

(Continued)

FOREIGN PATENT DOCUMENTS

| JP | 2002-138696 A | 5/2002 |
| KR | 20-0197020 Y1 | 9/2000 |
| KR | 10-2006-0003154 A | 1/2006 |

OTHER PUBLICATIONS

International Search Report and International Publication for PCT Application PCT/KR2011/005116.

*Primary Examiner* — William Gilbert
*Assistant Examiner* — Kyle Walraed-Sullivan
(74) *Attorney, Agent, or Firm* — Garcia-Zamor IP Law; Ruy M. Garcia-Zamor

(57) ABSTRACT

The present invention relates to a container-type system booth for an indoor/outdoor exhibition or event. According to the container-type system booth of the present invention, facilities used for exhibitions or various events are installed in an event module consisting of a single unit. Then, the event module unit may be installed at a desired place to reduce installation costs and time in installing facilities, and simplify the installation work processes. The event module consisting of a single unit may be produced in the form of various system booths such as a stage system booth, a radial system booth, a blooming system booth, a cubic system booth, a stack system booth, a parallel system booth, and a pinwheel system booth as the exhibition or event progresses. Thus, various stages for exhibitions or events may be optimally created.

5 Claims, 41 Drawing Sheets

(56) References Cited

U.S. PATENT DOCUMENTS

| | | | |
|---|---|---|---|
| 4,644,708 A * | 2/1987 | Baudot et al. | 52/79.9 |
| 4,833,841 A * | 5/1989 | Ellington, III | 52/79.1 |
| 5,154,509 A * | 10/1992 | Wulfman et al. | 362/648 |
| 5,491,939 A * | 2/1996 | Wang | 52/185 |
| 2004/0231256 A1 * | 11/2004 | Ohnishi | 52/236.7 |
| 2007/0074463 A1 * | 4/2007 | Ziegelman | 52/79.1 |
| 2007/0245638 A1 * | 10/2007 | Lai | 52/79.1 |
| 2007/0271857 A1 * | 11/2007 | Heather et al. | 52/79.9 |

* cited by examiner

350

360

361

CONTAINER-TYPE SYSTEM BOOTH FOR AN INDOOR/OUTDOOR EXHIBITION OR EVENT

CROSS REFERENCE TO RELATED APPLICATIONS

This application claims priority to the following patent applications: (1) Patent Cooperation Treaty Application PCT/KR2011/005116 filed Jul. 12, 2011; and (2) Korean Application No. 10-2010-0092273 filed Sep. 20, 2010; each of the above cited applications is hereby incorporated by reference herein as if fully set forth in its entirety.

TECHNICAL FIELD

The present invention relates to a container-type system booth for an exhibition or event. According to the container-type system booth of the present invention, facilities used for exhibitions or various events are installed in an event module consisting of a single unit. Then, the event module unit may be installed at a desired place to reduce installation costs and time in installing facilities, and simplify the installation work processes. The event module consisting of a single unit may be provided in the form of various system booths such as a stage system booth, a radial system booth, a blooming system booth, a cubic system booth, a stack system booth, a parallel system booth, and a pinwheel system booth as the exhibition or event progresses. Thus, various stages for exhibitions or events may be optimally created. Also, beyond a single layered structure, a limited space is effectively used. The container-type system booth for indoor/outdoor exhibitions or events is strong and durable not only indoors but outdoors.

BACKGROUND ART

Generally, when holding indoor/outdoor exhibitions or general events, facilities for the exhibitions or events are necessary.

It is necessary to determine how to install exhibition facilities to maximize an exhibition effect of goods while exhibiting the goods. That is, when the facilities are installed to show off exhibited goods, it is possible to maximize the exhibition effect. However, in the case of facilities that fail to show off the exhibited goods, users may not know what is exhibited.

Also, when performing events such as general concerts, presentations, and demonstrations, facilities for forming stages and configurations of facilities enabling users to enjoy refreshments or to carry out talks are important.

As described above, since facilities necessary to hold exhibitions or various events are very important, construction of the facilities becomes one of important elements and then an industrial field related to stage installation has been activated.

Particularly, it is necessary to seriously determine types, forms, and arrangements of installations at an initial step of designing the installations and a value of the installations built and completed once may be considerable.

However, most of installations for exhibitions or various events is merely for a single use and is demolished right after being installed in such a way that facilities or the installations are difficult to be used and abandoned when it is impossible to reuse, thereby causing resource waste problems.

When holding the same exhibitions or the same events in the case of concert tours or traveling exhibitions as a series of performances, since facilities or installations should be somehow differently installed each time according to environments or conditions for installation, although the installations are considerably helpful, it is difficult to perform by using the installations because there is no consistency.

Also, in the case of woodworking or general system booths as general exhibition space constructing methods, when being installed outdoors, it is difficult to provide durability due to natural restrictions of bad weather such as snow, rain, and wind, in which there are limitations in an installation method and place. Also, event places are used as single layered structures. Although when it is possible to display duplex type structures, since constructed structures are poor, it is difficult to be used as available spaces for events. It is difficult to maximize efficiency of using places (spaces).

Accordingly, a technology of providing durability regardless of places (indoor/outdoor) for installation, capable of setting an event hall in a short time to efficiently use a limited space, and allowing repetitive usage to be possible to prevent resource wastes is necessary.

DISCLOSURE OF THE INVENTION

Technical Problem

To solve the problems described above, instead of a typical method of preparing and assembling a large number of single installation members whenever holding exhibitions or events, an aspect of the present invention provides a unit configuration as a module to hold exhibitions or events, which allows not only conveniently installing, transporting, disassembling, and reusing but maximizing durability and space efficiency of an unit module for holding exhibitions or events to provide one booth that is an independent exhibition/event space with one unit that becomes a minimum unit thereof to be used as a single unit event module used for holding indoor exhibitions or various events. The unit event module is installed in a desired place, thereby simplifying and reducing installation costs, installation time, and an installation process of facilities.

Also, each unit event module may be installed to hold exhibitions or various events, has excellent transportation properties of easily being transported to another place after the exhibitions or various events are finished and has reinstallation properties of being installed again in another place.

In addition, in the unit event module for holding exhibitions or various events, the entire inner configuration is supported by a plurality of module supports, a tetragonal top frame is provided as a top, and a tetragonal bottom frame is provided as a bottom, thereby stably forming a structure of the entire unit event module. Then, when a plurality of the unit event modules having the strong stable structure is deposited to form the entire system booth, individual unit event modules are formed to be strong in such a way that the entire structure of the system booth is safely maintained, thereby allowing users to safely join various exhibitions and events.

Additionally, the event module consisting of a single unit may be provided according to holding exhibitions or various events, in the form of various system booths such as a stage system booth, a radial system booth, a blooming system booth, a cubic system booth, a stack system booth, a parallel system booth, and a pinwheel system booth as the exhibition or event progresses, thereby optimally holding various events.

Technical Solution

According to an aspect of the present invention, there is provided a container-type system booth for holding an indoor/outdoor exhibition or event, the container-type system booth including a unit event module 11, wherein the unit event module 11 includes: a tetragonal top frame 21 having four sides provided above four module supports 12, a tetragonal bottom frame 41 having four sides provided below the four module supports 12, a top panel 22 installed toward the inside of the tetragonal top frame 21 and covering a rooftop, top strengthening pipes 23 connected to the tetragonal top frame 21 having the four sides and supporting a bottom of the top panel 22, a bottom panel 42 installed toward the inside the tetragonal bottom frame 41 and forming a bottom surface, bottom strengthening pipes 43 connected to the tetragonal bottom frame 41 having the four sides and supporting the bottom panel 42, transportation pipes 44 located between the bottom strengthening pipes 43 and extended frontward and backward, and the four module supports 12 connecting the tetragonal top frame 21 and the tetragonal bottom frame 41 to one another, wherein the unit event module 11 is installed indoors or outdoors as one or a plurality thereof to be provided as facilities for exhibitions or events.

Advantageous Effects

Different from typical technology, the present invention provides an outstanding effect of installing one booth that is an independent exhibition/event space with one unit that becomes a minimum unit thereof to be used as a single unit event module used for holding indoor exhibitions or various events. The unit event module is installed in a desired place, thereby simplifying and reducing installation costs, installation time, and an installation process of facilities.

Particularly, each unit event module may be installed to hold exhibitions or various events, has excellent transportation properties of easily being transported to another place after the exhibitions or various events are finished and has reinstallation properties of being installed again in another place.

In addition, in the unit event module for holding exhibitions or various events, the entire inner configuration is supported by a plurality of module supports, a tetragonal top frame is provided as a top, and a tetragonal bottom frame is provided as a bottom, thereby stably forming a structure of the entire unit event module. Then, when a plurality of the unit event modules having the strong stable structure is deposited to form the entire system booth, individual unit event modules are formed to be strong in such a way that the entire structure of the system booth is safely maintained, thereby allowing users to safely join various exhibitions and events.

Also, a separate drain, a rainwater hole, and dripping rod are provided on a top panel part and a tetragonal top frame in such a way that rainwater does not enter the unit event module and is smoothly discharged when being installed outdoors, thereby freely holding exhibitions or various events.

Also, with respect to a bottom, a bottom panel and a bottom strengthening panel are provided, thereby obtaining effects of soundproofing and keeping warmth. Also, in addition to a tetragonal bottom frame, bottom strengthening pipes and a bottom strengthening frame strongly support the bottom panel and the bottom strengthening panel.

In addition, the event module consisting of a single unit may be provided according to holding exhibitions or various events, in the form of various system booths such as a stage system booth, a radial system booth, a blooming system booth, a cubic system booth, a stack system booth, a parallel system booth, and a pinwheel system booth as the exhibition or event progresses, thereby optimally holding various events and maximizing space occupancy by three-dimensionally using a limited exhibition/event space.

MODE FOR CARRYING OUT THE INVENTION

Figure 1:
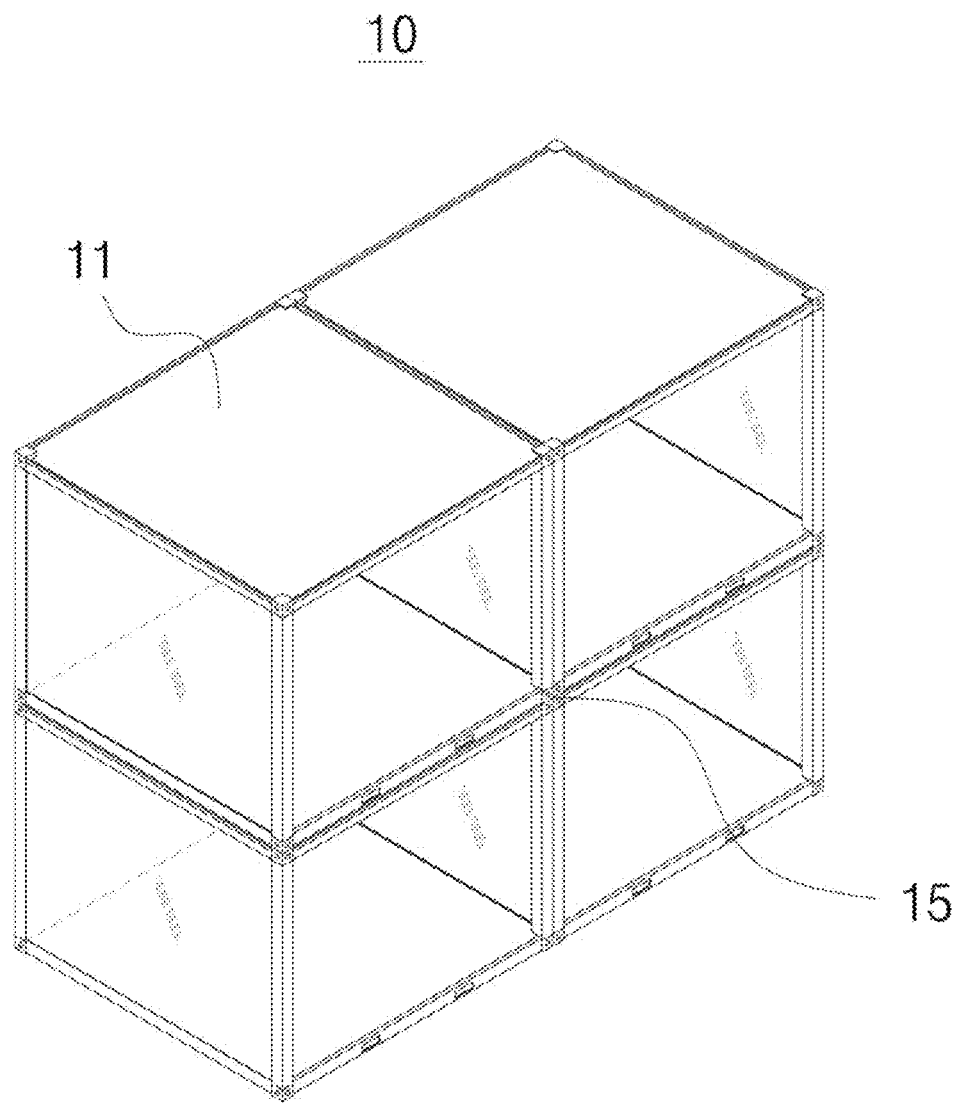
FIG. 1 is a perspective view illustrating a system booth according to an embodiment of the present invention.

Hereinafter, exemplary embodiments of the present invention will be described in detail with reference to the attached drawings.

A container type system booth 10 for indoor and outdoor exhibitions and events, as shown in FIGS. 1 to 47, is formed of module blocks that are unit event modules 11 for constructing an exhibition system or an event system, the unit event modules 11 capable of being used for freely exhibiting products and goods or holding various events.

Accordingly, since it is possible to install the unit event modules 11 having a single module block shape by using vehicles or other transportation means to hold an exhibition and an event, facilities installed once may be used as they are.

Also, various facilities are formed by arranging or stacking several unit event modules 11 having the module block shape, thereby being used for various uses and being useful.

A detailed configuration of the unit event module 11 that is a single event module block of the system booth 10 according to the present embodiment is as follows.

The unit event module 11 includes a tetragonal top frame 21 having four sides provided above four module supports 12 and a tetragonal bottom frame 41 having four sides provided below the four module supports 12.

Figure 2:
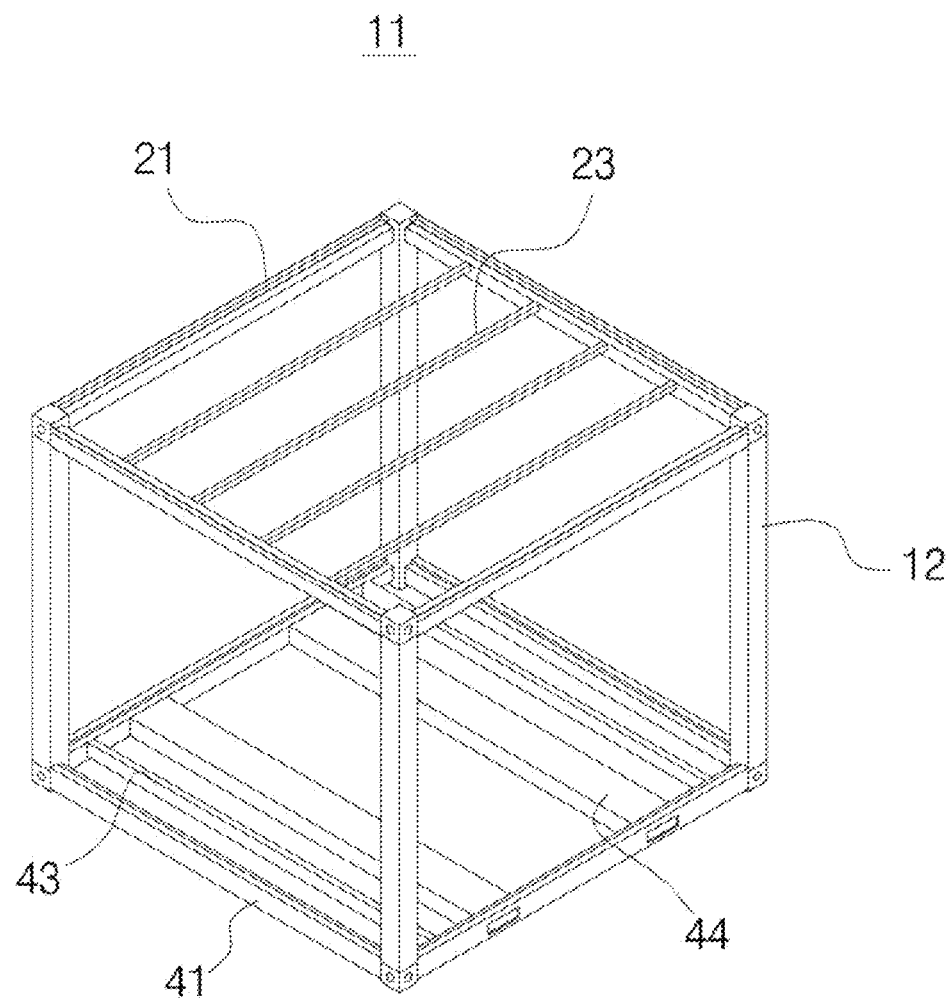
FIG. 2 is a perspective view illustrating a frame of a unit event module of the system booth according to an embodiment of the present invention.
Figure 3:
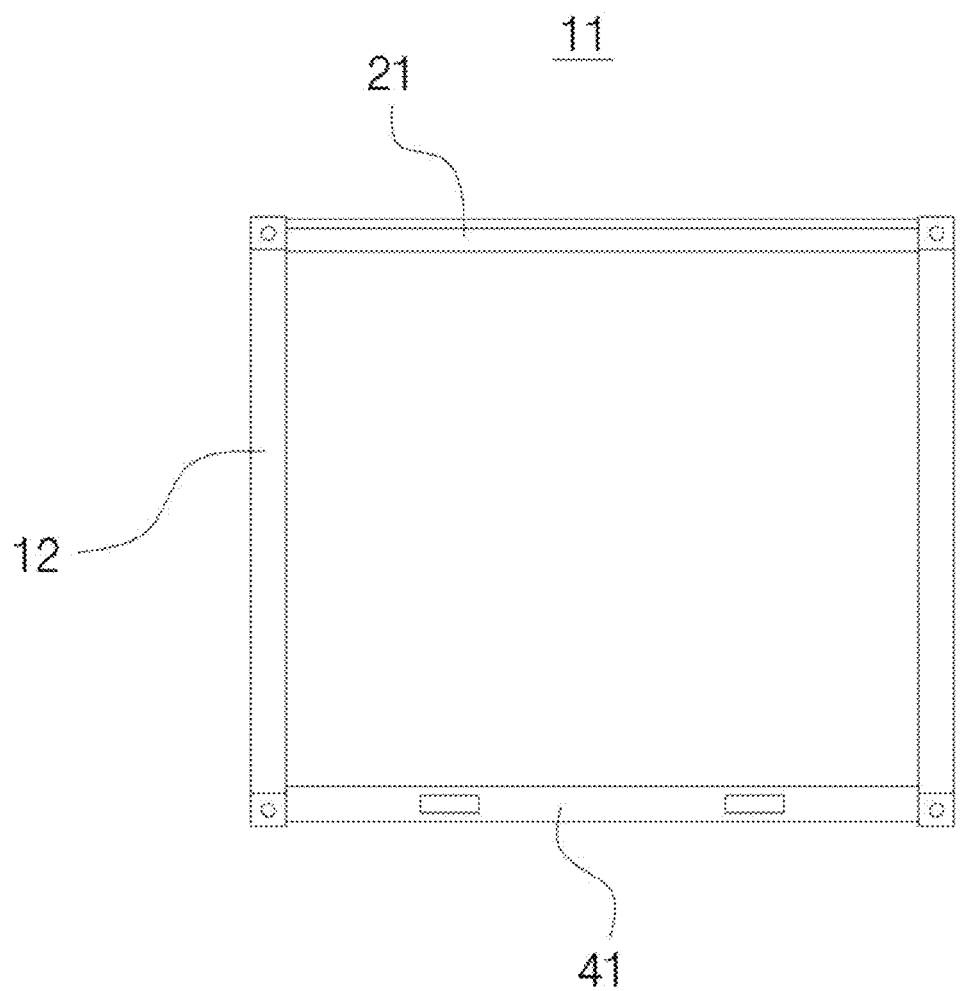
FIG. 3 is a front view illustrating the frame of the unit event module of the system booth according to an embodiment of the present invention.
Figure 4:
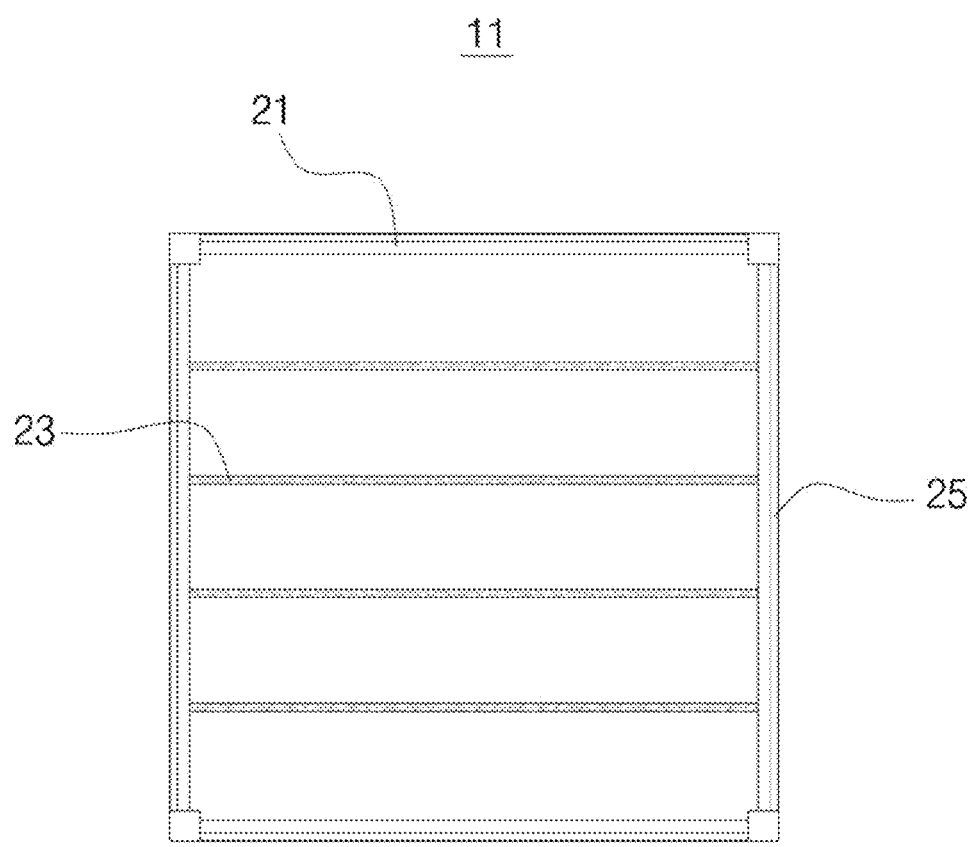
FIG. 4 is a top view illustrating a top frame of the unit event module of the system booth according to an embodiment of the present invention.
Figure 5:
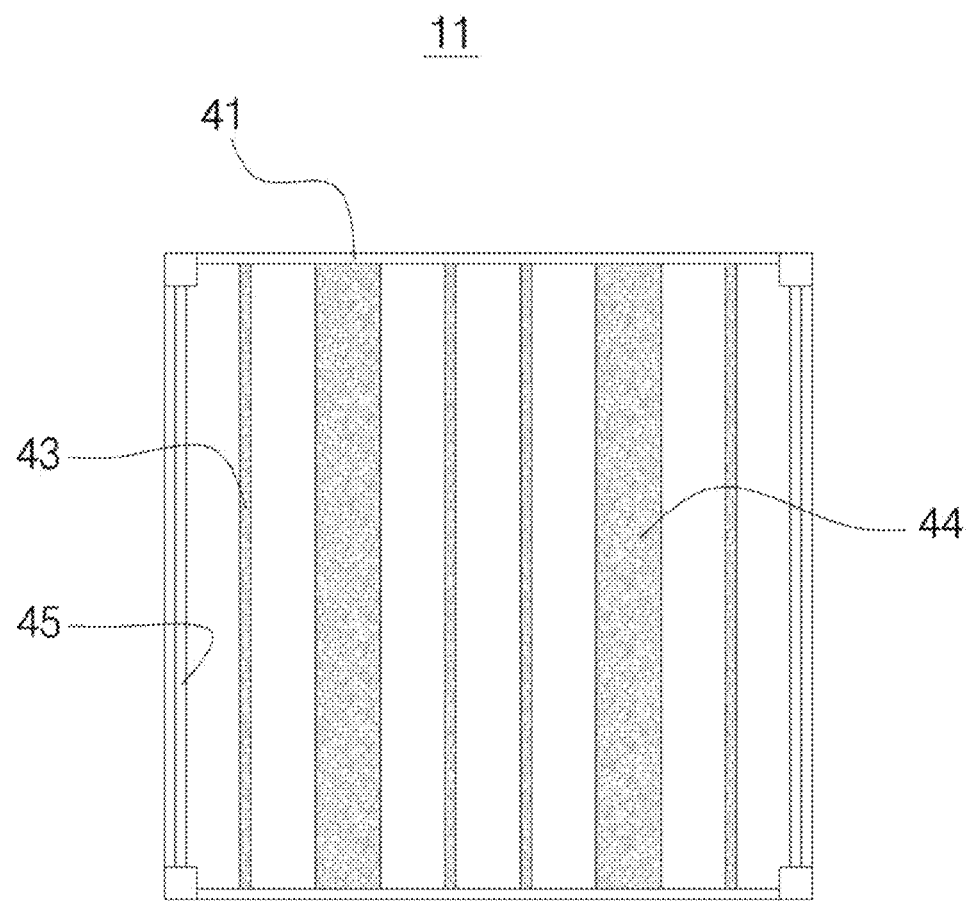
FIG. 5 is a top view illustrating a bottom frame of the unit event module of the system booth according to an embodiment of the present invention.
Figure 6:
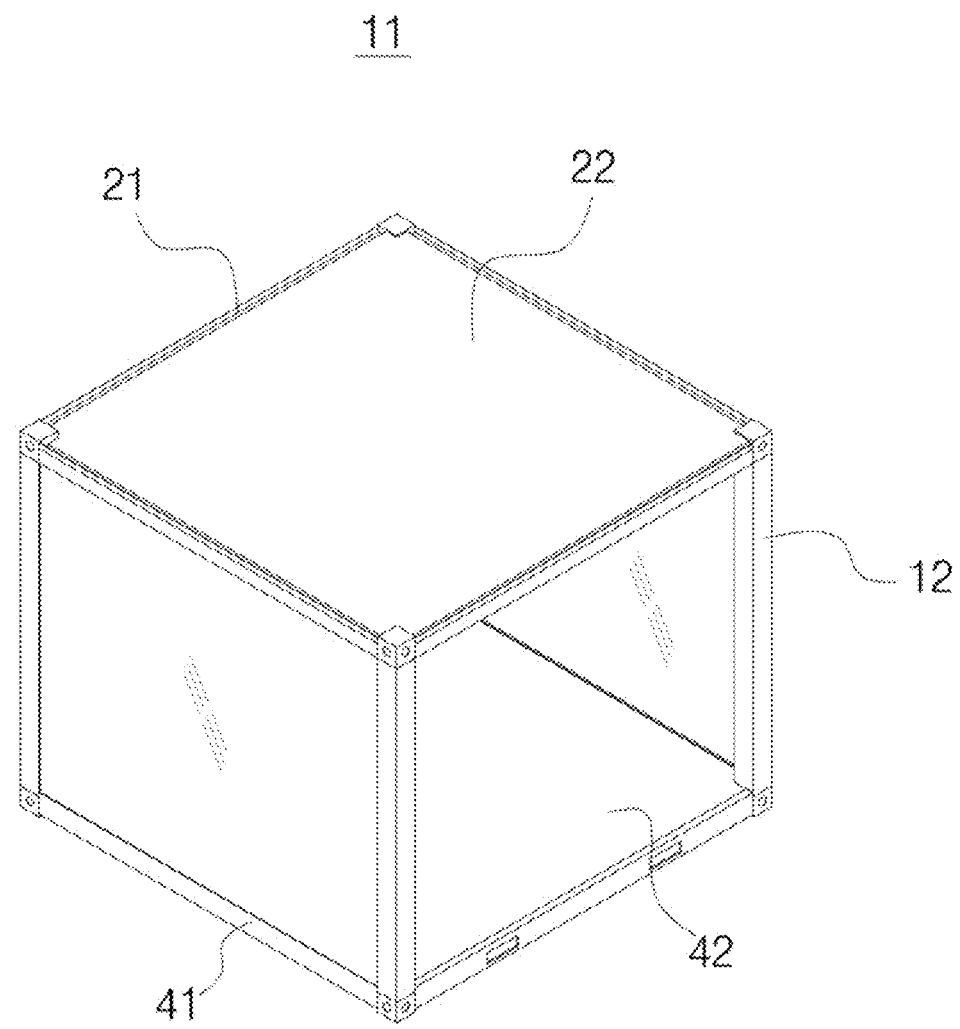
FIG. 6 is a perspective view illustrating the unit event module of the system booth according to an embodiment of the present invention.
Figure 7:
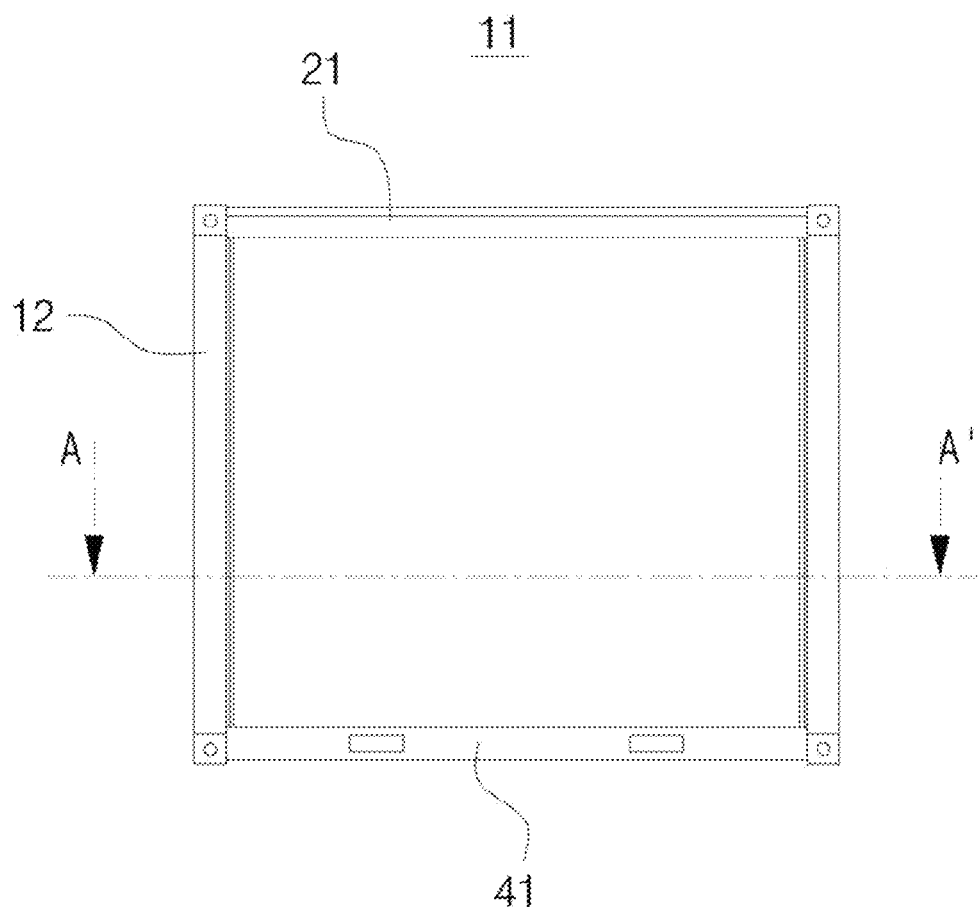
FIG. 7 is a front view illustrating the unit event module of the system booth according to an embodiment of the present invention.
Figure 8:
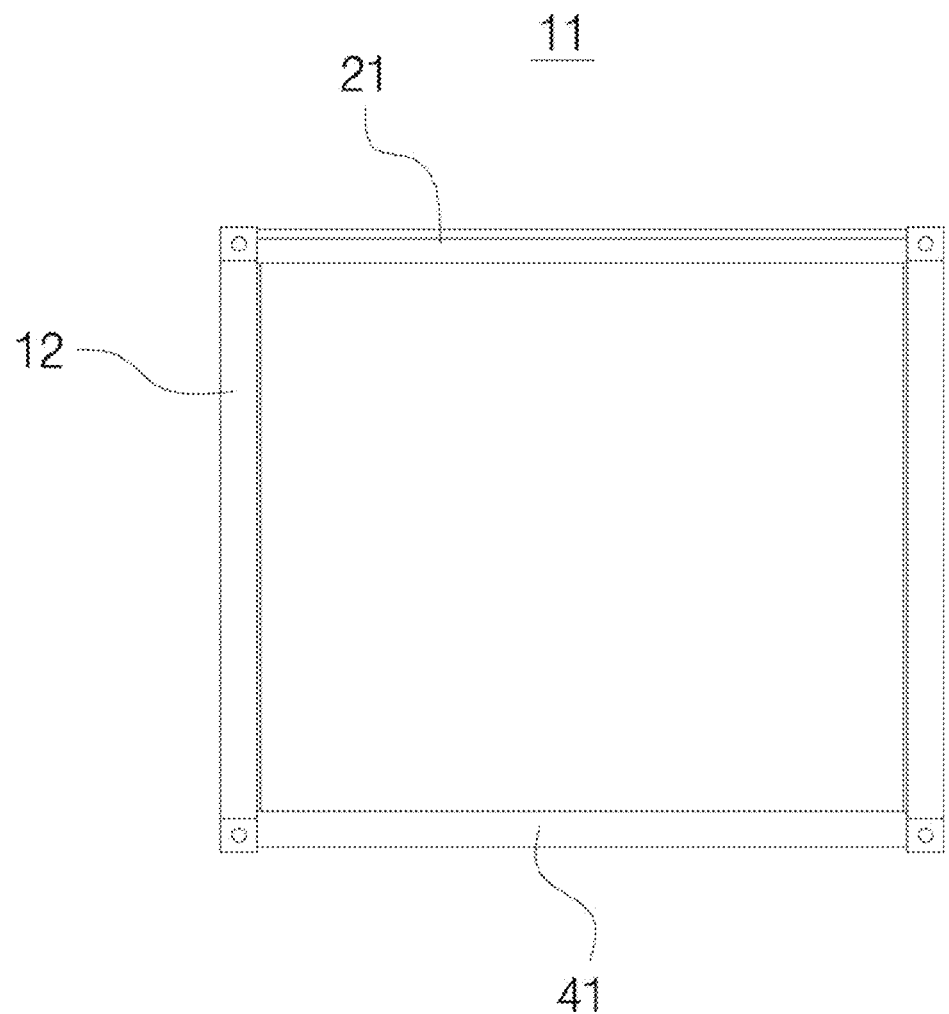
FIG. 8 is a side view illustrating the unit event module of the system booth according to an embodiment of the present invention.
Figure 9:
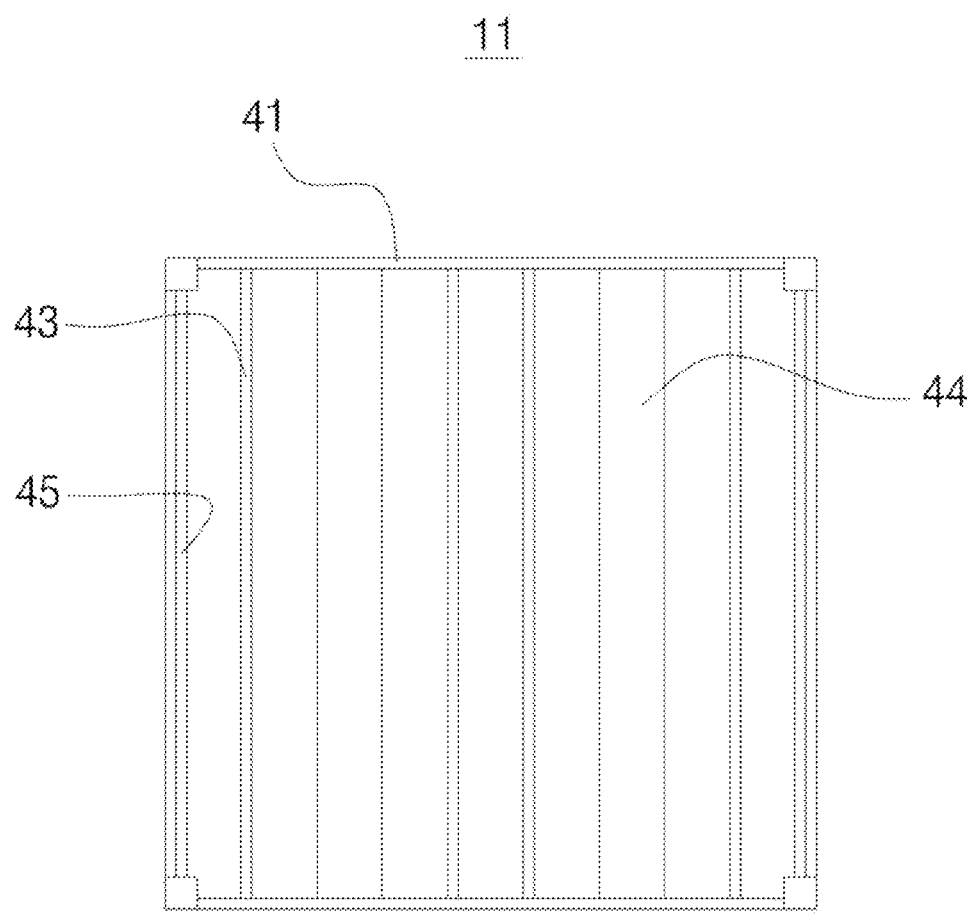
FIG. 9 is a top view illustrating the bottom frame of the unit event module of the system booth according to an embodiment of the present invention.

A basic frame of the unit event module 11 is formed of the four module supports 12, the tetragonal top frame 21, and the tetragonal bottom frame 41 as shown in FIG. 2. Accordingly, since the unit event module 11 is formed of total 12 frames, although when the unit event module 11 is stacked as a multilayer, is arranged to a plurality thereof, or is installed while being attached to other facilities, the shape of the system booth 10 including the unit event module 11 does not loose posture thereof and form a strongly installed structure. Accordingly, it is possible to safely holding exhibitions and various events with no accident.

Also, A top panel 22 installed toward the inside of the tetragonal top frame 21 and covering a rooftop and a bottom panel 42 installed toward the inside the tetragonal bottom frame 41 and forming a bottom surface are provided.

A rear, both sides, and a front may be formed of, if necessary, one of a steel plate, an acryl plate, a glass plate, a hinged door, a sliding door, and a wall with a partially open and shut door. Therefore, the unit event module 11 may be properly applied and managed according to installation conditions such as exhibitions and events.

Also, top strengthening pipes 23 connected to the tetragonal top frame 21 having the four sides and supporting a bottom of the top panel 22 are provided and allows the top panel 22 and other facilities installed on the rooftop to be stable.

In addition, bottom strengthening pipes 43 connected to the tetragonal bottom frame 41 having the four sides and supporting the bottom panel 42 are provided and supports facilities installed inside the unit event module 11.

In addition thereto, as shown in the attached drawing, transportation pipes 44 located between the bottom strengthening pipes 43 and extended frontward and backward are provided. The transportation pipes 44 are for being transported by a transportation vehicle such as a forklift (not shown) in order to transport the unit event module 11 to a location for installation or to easily transport the installed unit event module 11. Accordingly, the unit event module 11 of the system booth 10 is allowed to be easily installed or movable.

One or a plurality of the unit event module 11 formed as described above is installed for indoor exhibitions and events or outdoor exhibitions and events, which forms the container type system booth 10 for indoor and outdoor exhibitions or events.

In a more detailed configuration of the unit event module 11, a drainage system is provided on edges of the tetragonal top frame 21 and the top panel 22 forming edges of the rooftop. That is, a clapboard 24 forming a raised part is formed on top edges of the tetragonal top frame 21. Also, between the clapboard 24 and edges of the top panel 22, a groove is formed in a longitudinal direction above the tetragonal top frame 21, thereby forming a drain 25 for rainwater.

Thus, the top panel 22 provided to cover the entire surface of the rooftop that is an upper part of the unit event module 11 protects the unit event module 11 from rainwater when being installed outdoors. Also, the rainwater falling down onto the top panel 22 may be collected into the drain formed on the edges of the top panel 22. Then, the rainwater collected into the drain 25 is discharged outward.

Hereupon, a rainwater hole 26 for drainage is formed above the module supports 12 in contact with the drain 25. That is, the rainwater falling down onto the top panel 22 and collected into the drain 25 is discharged via the rainwater hole 26, in which most of the rainwater is discharged via the rainwater hole 26. When the rainwater hole 26 is formed to be connected to the inside of the module support 12, the rainwater may flow inside the module support 12 toward a bottom of the module support 12 and may be discharged. In this case, an additional drain may be formed below the module support 12 to allow the rainwater to be discharged outward.

Also, when the rainwater hole 26 is formed with a pipe to penetrate a top of the module support 12 to the outside, the rainwater may be discharged via the pipe connected to the rainwater hole 26 and projected outward. An end of the pipe for discharging the rainwater is connected to the ground in such a way that the discharged rainwater does not splash toward other parts.

Figure 10:
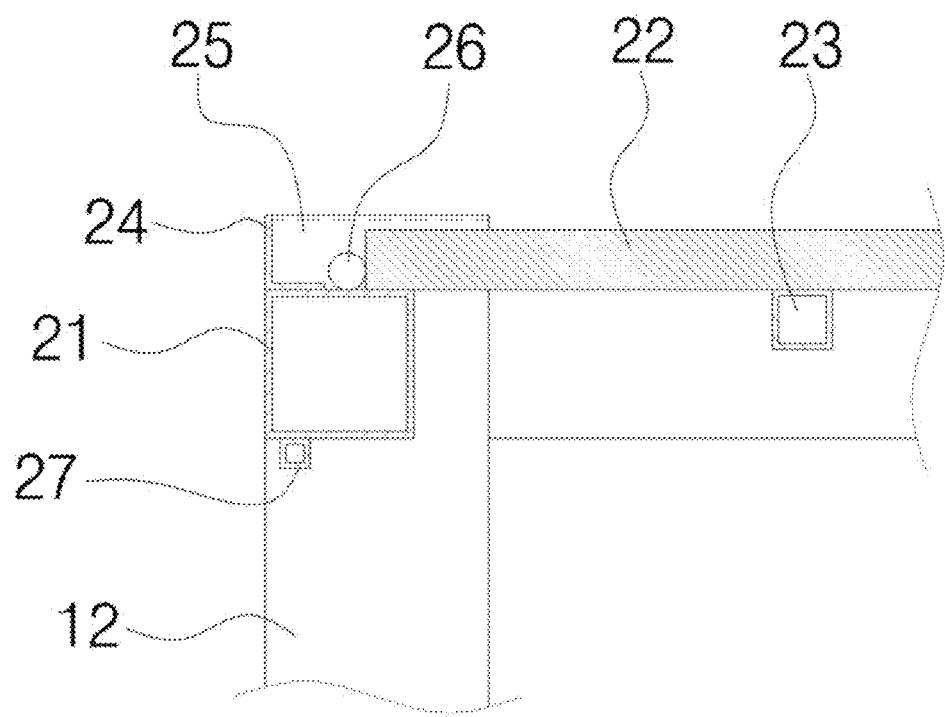
FIG. 10 is a cross-sectional view illustrating a drain for rainwater on a roof of the unit event module of the system booth according to an embodiment of the present invention.

Also, as shown in FIG. 10, one or a plurality of dripping rod 27 projected downwardly may be installed below the tetragonal top frame 21 horizontally installed among the members forming the rooftop. With respect to the dripping rod 27, the rainwater may flow along a wall surface or respective frames when it rains. When the rainwater flows along the wall surface or the frames, the rainwater may flow along the bottom of the tetragonal top frame 21 that is an edge frame. Hereupon, the dripping rod 27 is formed below the tetragonal top frame 21 and the flowing rainwater gathers onto the dripping rod 27, thereby preventing the rainwater from flowing toward other parts. Thus, the rainwater does not splash toward other goods installed inside the unit event module 11 and gathers onto a desired place, thereby preventing damages of internal facilities. A drain hose or a splashing board may be further added while being connected to the dripping rod 27 in order to safely discharge the rainwater.

Figure 11:
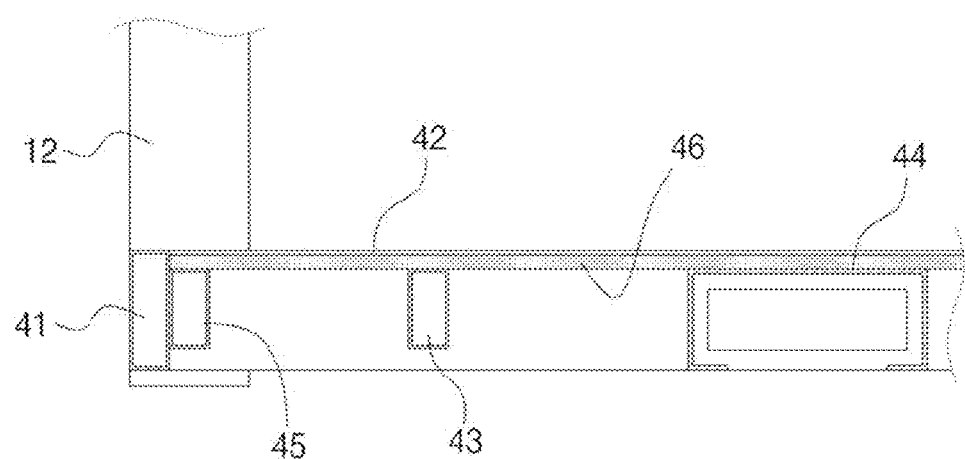
FIG. 11 is a cross-sectional view illustrating the bottom frame of the unit event module of the system booth according to an embodiment of the present invention.
Figure 12:
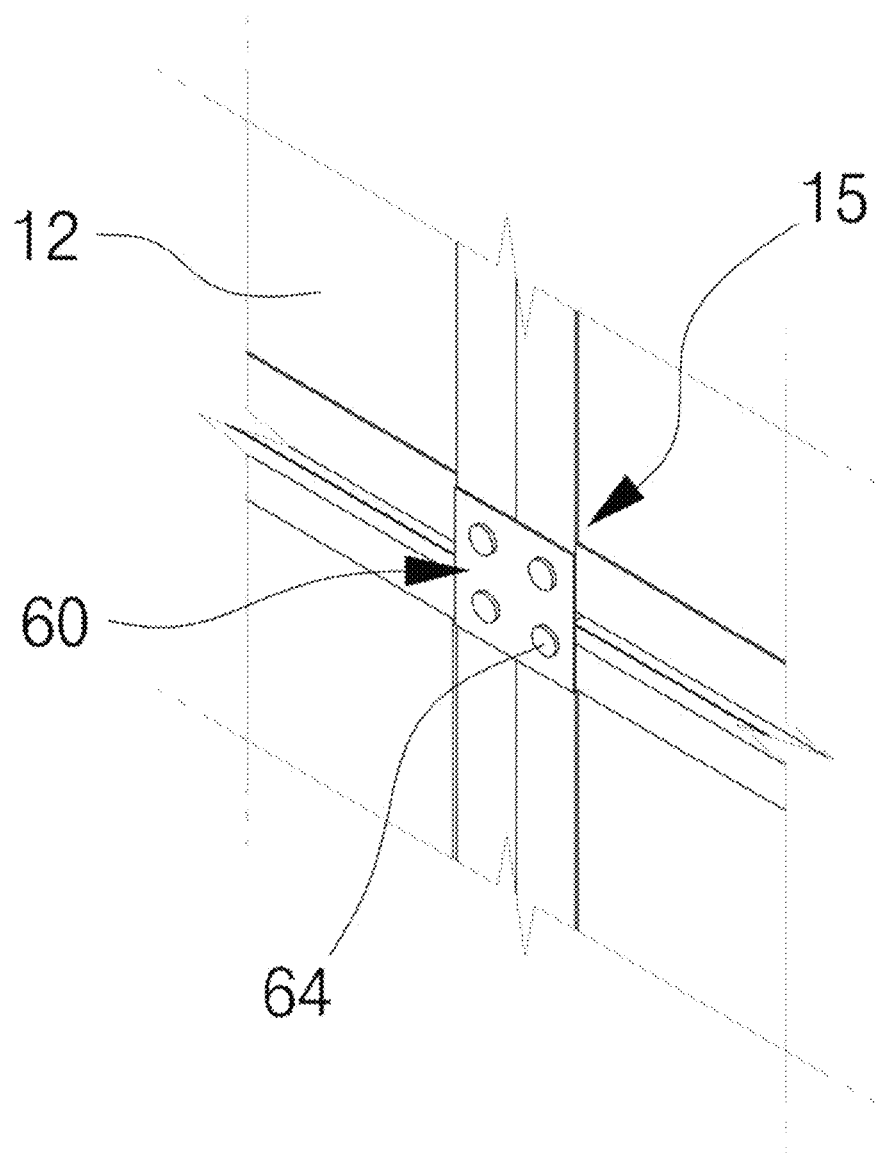
FIG. 12 is a perspective view illustrating a connected-fastened installation member of the unit event module of the system booth according to an embodiment of the present invention.
Figure 13:
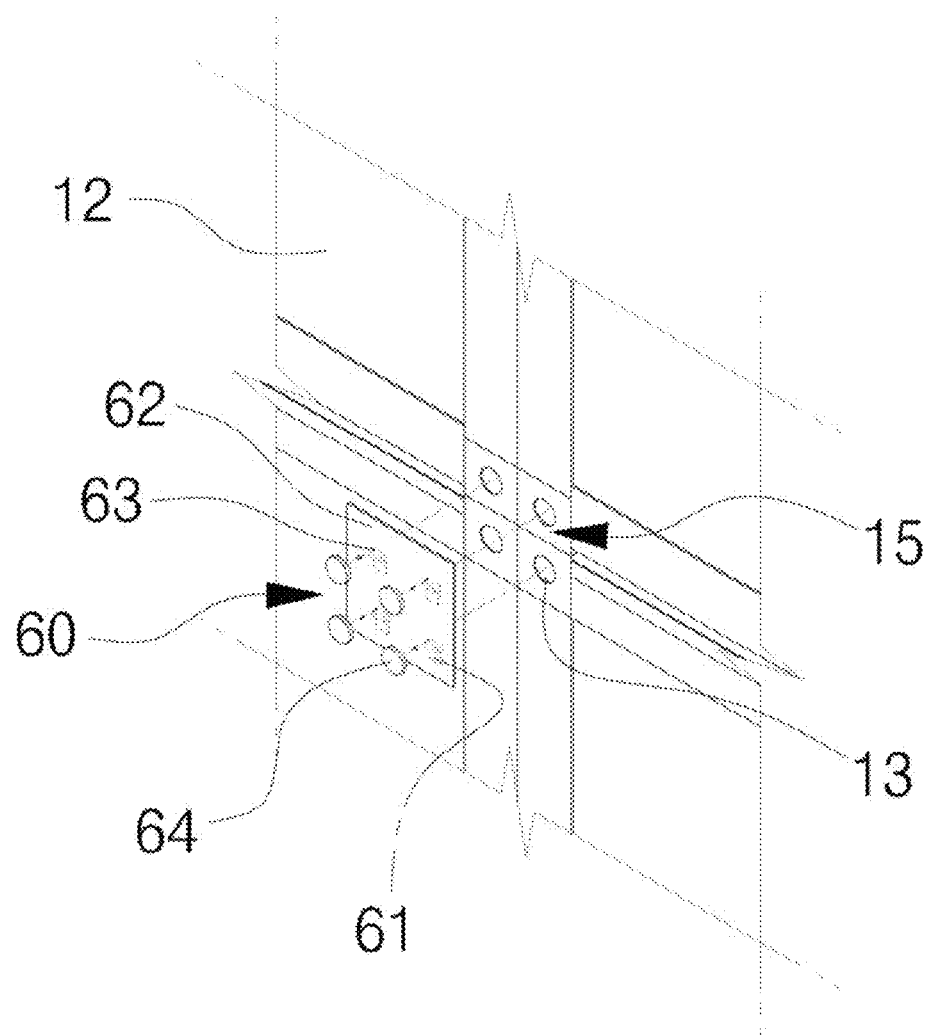
FIG. 13 is an exploded-perspective view illustrating the connected-fastened installation member of the unit event module of the system booth according to an embodiment of the present invention.
Figure 14:
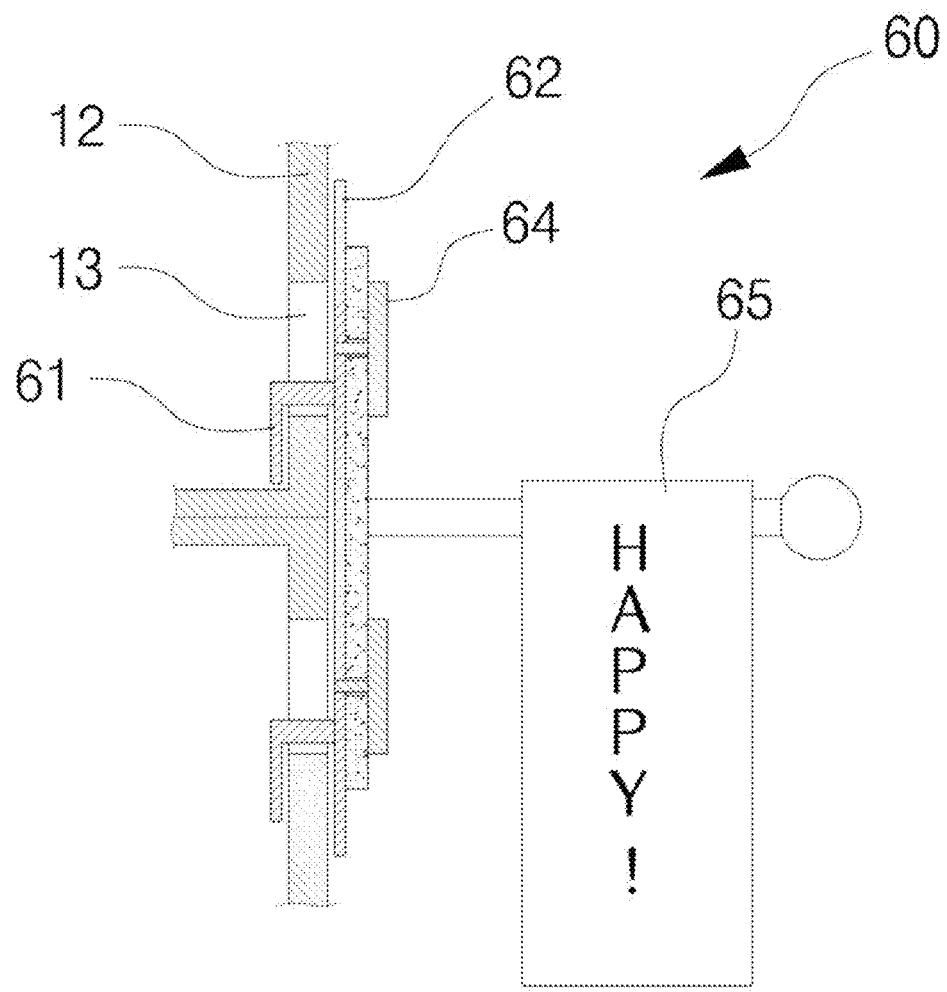
FIG. 14 is a cross-sectional view illustrating a coupled state of the connected-fastened installation member of the unit event module of the system booth according to an embodiment of the present invention.
Figure 15:
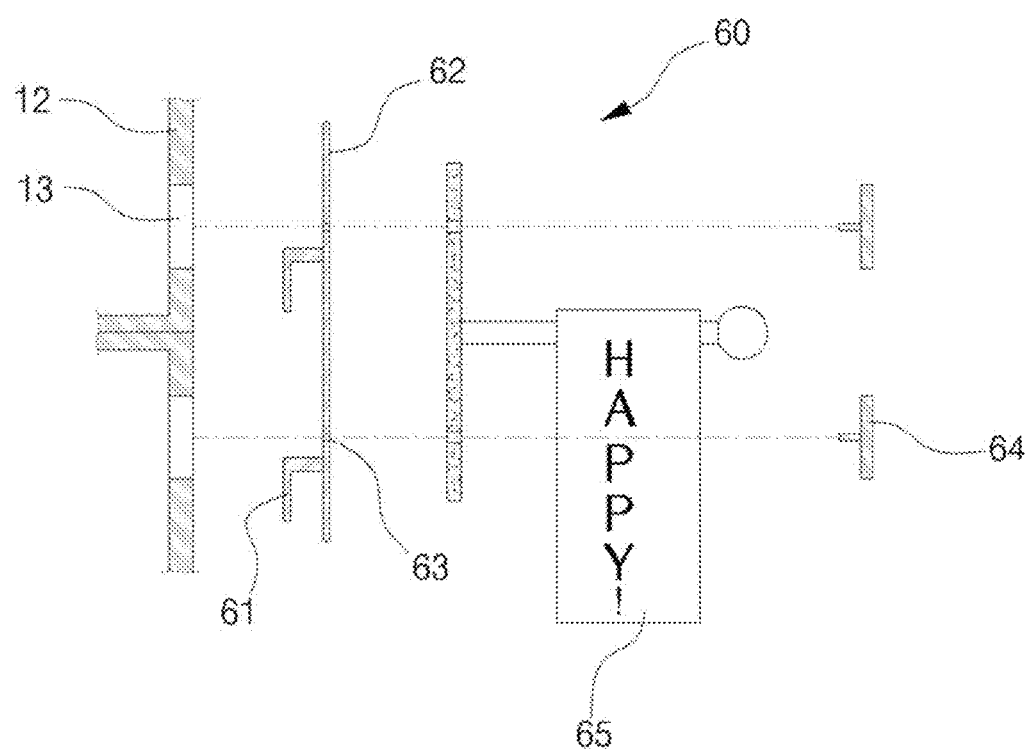
FIG. 15 is a cross-sectional view illustrating a state in which elements of the connected-fastened installation member of the unit event module of the system booth according to an embodiment of the present invention are separated.
Figure 16:
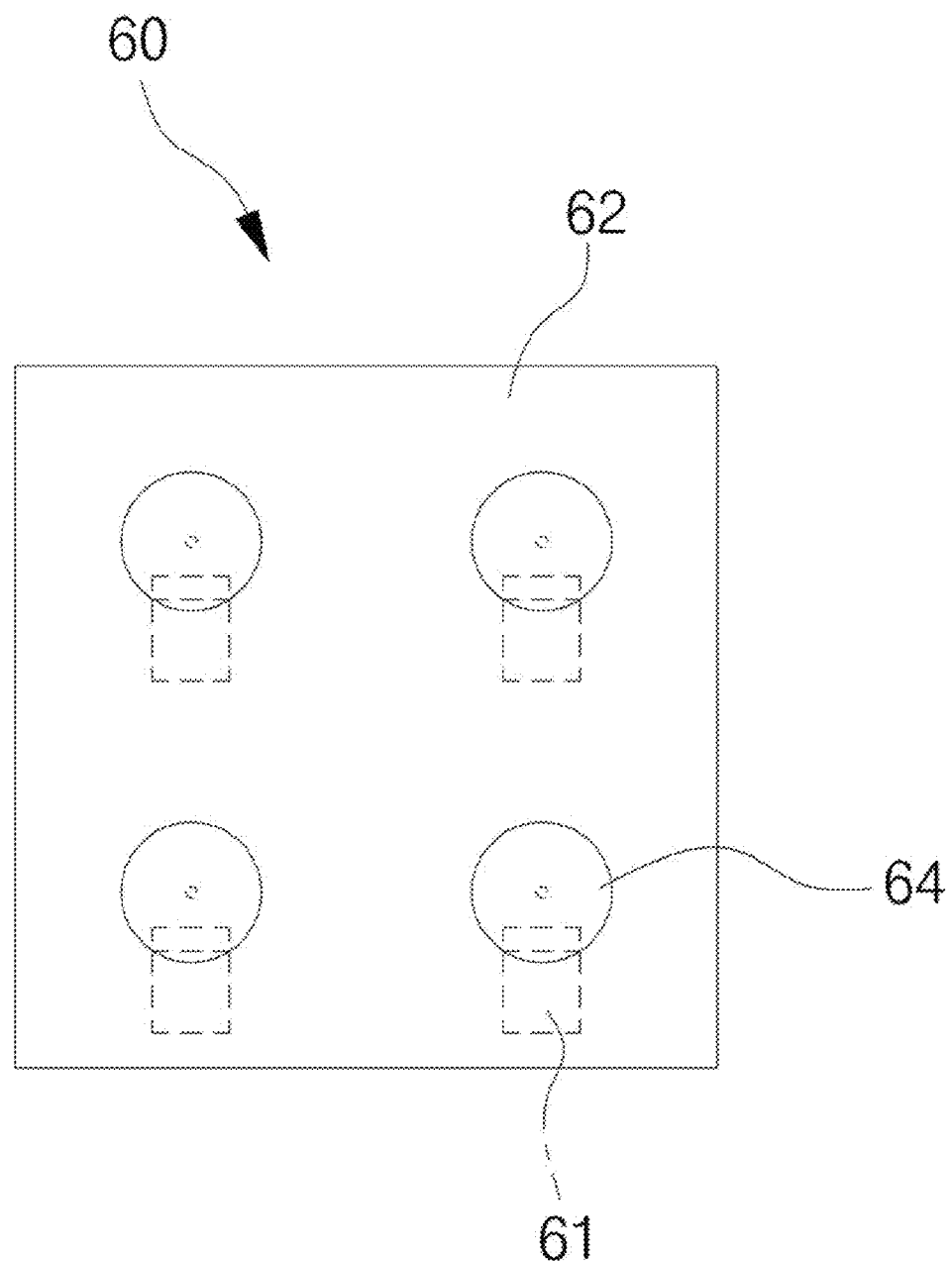
FIG. 16 is a front view illustrating the connected-fastened installation member of the unit event module of the system booth according to an embodiment of the present invention.
Figure 17:
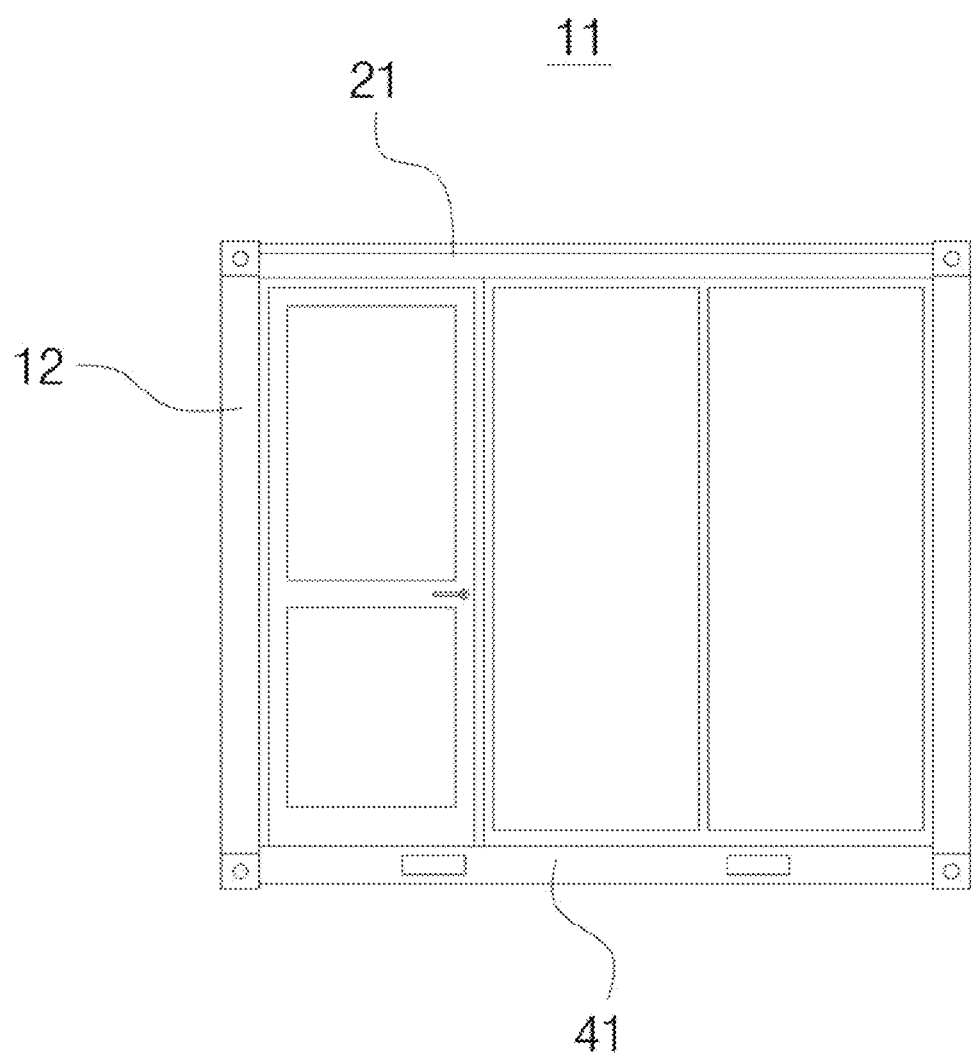
FIG. 17 is a front view illustrating an entrance door of the unit event module of the system booth according to an embodiment of the present invention.
Figure 18:
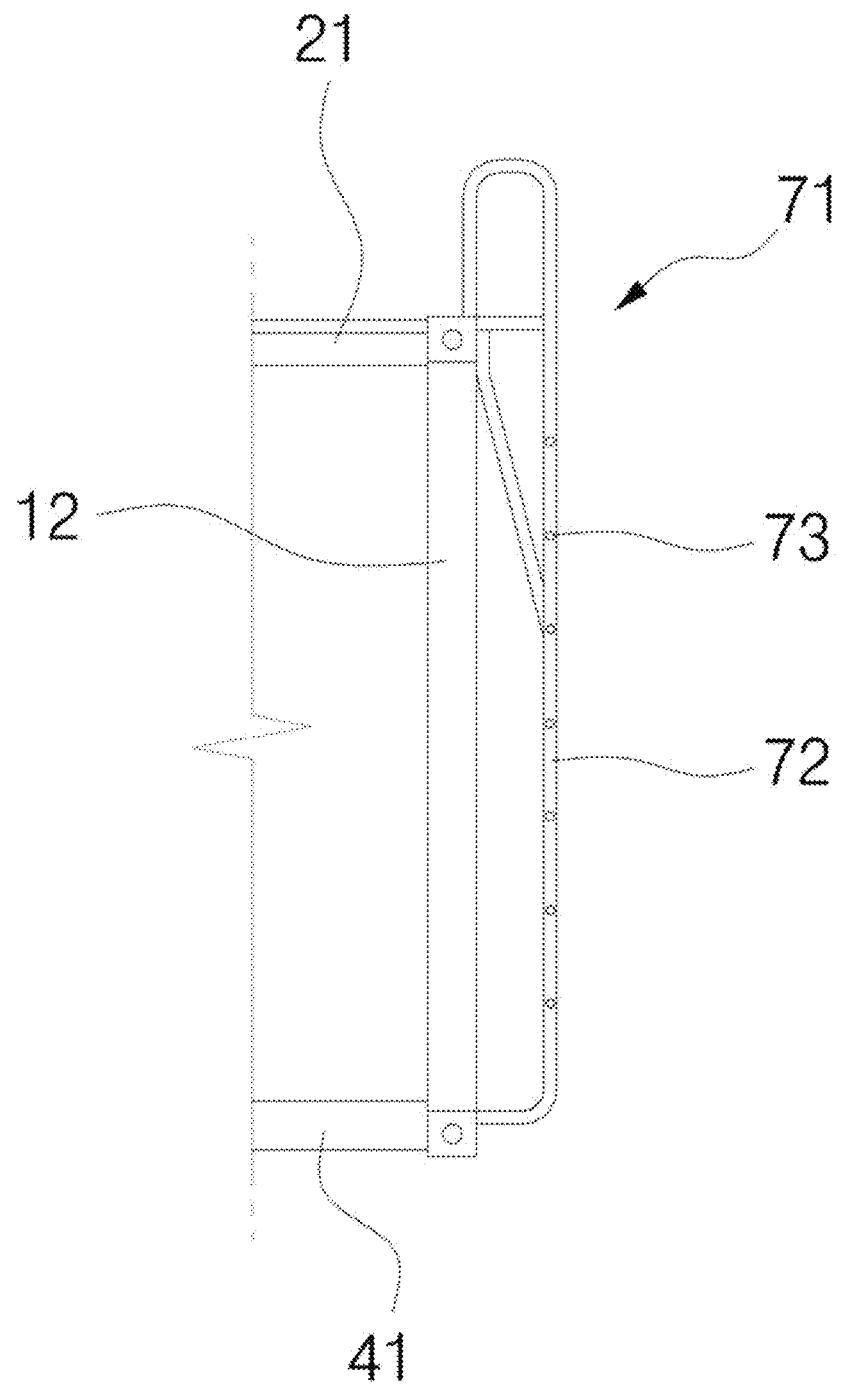
FIG. 18 is a side view illustrating a ladder of the unit event module of the system booth according to an embodiment of the present invention.
Figure 19:
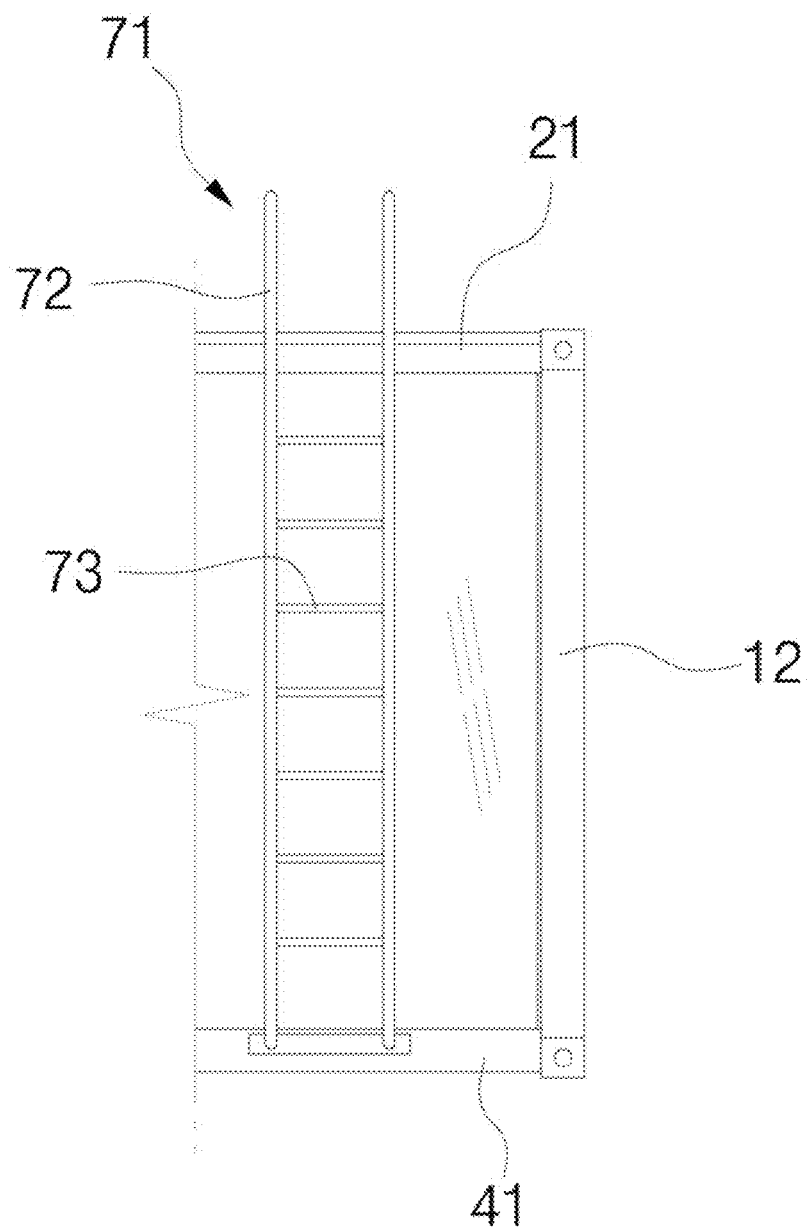
FIG. 19 is a front view illustrating the ladder of the unit event module of the system booth according to an embodiment of the present invention.

Next, on a bottom of the unit event module 11, as shown in FIG. 11, a bottom strengthening support frame 45 formed together with the inside of the tetragonal bottom frame 41 as a single body and having a lower height than the tetragonal bottom frame 41 may be further provided.

Thus, since the bottom strengthening support frame 45 is further provided in addition to the tetragonal bottom frame 41, the entire bottom frame structure becomes stronger and may strongly support facilities although a large amount of facilities are installed inside the unit event module 11.

Also, a bottom strengthening panel 46 located below the bottom panel 42 installed toward the inside of the tetragonal bottom frame 41 and supported by the bottom strengthening pipes 43 and the bottom strengthening frame 45 may be further provided.

Hereupon, the bottom panel 42 may be protected from being damaged by external scratches and may have excellent waterproofing properties in order not to be easily damaged although various types of facilities are installed thereon and in order to allow repetitive uses of several times.

Mostly, the bottom panel 42 may be formed of various materials such as synthetic resins, woods, other bricks, stones, tiles, etc, and may be provided by using various installation methods.

Also, the bottom strengthening panel 46 located below the bottom panel 42 may have soundproofing properties of absorbing impacts made by people step over and vibrations in order to provide stable feeling for use with no unpleasant feeling.

In a part of the configuration, a heat-retaining member may be provided together with the bottom strengthening panel 46 for convenience of use in winter.

Additionally, in the unit event module 11 of the system booth 10 of the present embodiment, as shown in FIGS. 12 to 16, at an intersection 15 where a plurality of the unit event modules 11 is coupled and intersects with one another, a connected-fastened installation member 60 may be further provided. Hereupon, in the attached drawings, four of the unit event modules 11 are installed as a two-storied structure and may be applied as various arrangements such as one-storied laterally arranged structures and two-storied alternately arranged structures.

The connected-fastened installation member 60 is coupled with a module support hole 13 formed on each corner of the plurality of unit event modules 11 in such a way that a structure formed by coupling the plurality of the unit event modules with one another is stably maintained in order not to scatter the entire structure of the system booth 10. To fasten the connected-fastened installation member 60 to the unit event module 11, one of general methods such as a bolt-fastened method, an anchor-fastened method, a rivet-fastened method, other welding-fastened method, etc may be selected and used. Also, the corners of the plurality of the unit event modules 11 may be hidden by the connected-fastened installation member 60 in such a way that an exterior of the system booth 10 becomes fine and an advertising banner, a billboard, a sign, etc are provided, thereby an obtaining advertising effect.

As an example of configuration of the connected-fastened installation member 60, four pegs 61 formed in the shape of ㄱ, inserted into the module support holes 13 formed on the module supports 12 of the four unit event modules 11 are formed.

Also, a connected-fastened panel 62 with the pegs 61 fastened, which is formed in the shape of a flat panel to hide the intersection 15 of the coupled parts of the unit event modules 11, is provided.

Accordingly, on a rear of the connected-fastened panel 62, as one of the various connecting-fastening methods, the pegs 61 formed in the shape of ¬ are inserted into the respective corresponding module support holes 13 and coupled therewith, thereby prevent scattering of a coupled structure of the plurality of the unit event modules 11.

Also, connected-decorative bolts 64 coupled with decorative-bolt-fastened holes 63 formed on the connected-fastened panel 62, at positions of the module support holes 13 of the plurality of the unit event modules 11, may be provided to hide the module support holes 13.

A banner installation element 65 may be provided by using the connected-decorative bolts 64 allowing the banner installation element 65 to be stably coupled with the connected-fastened installation members 60.

Then, on the banner installation element 65, an advertisement, a company name, a description, a sign, a road sign, etc may be displayed.

In addition, non-slip projections 16 projected downwardly are formed on four corners of bottom edges of the unit event module 11 and non-slip grooves 17 are formed on four corners of top edges thereof in such a way that the unit event module 11 is mounted on a top of another unit event module 11 located below, thereby forming a stable structure with no shaking when a plurality of the unit event modules 11 is deposited.

Then, a ladder 71 installed on an outer side surface of the unit event module 11 may be further provided. The ladder 71 includes a pair of handrails 72, each including an upper end fastened to one of the top surface and a side surface of the tetragonal top frame 21 and a lower end fastened to a side surface of the tetragonal bottom frame 41, which is entirely formed in a U shape, and includes a plurality of step-bars 73 vertically arranged between the handrails 72.

Accordingly, to manage double-storied unit event modules 11 or facilities on the rooftop of the unit event module 11, a user may ascend or descend by using the handrails 72 and step-bars 73 of the ladder 71.

Figure 23:
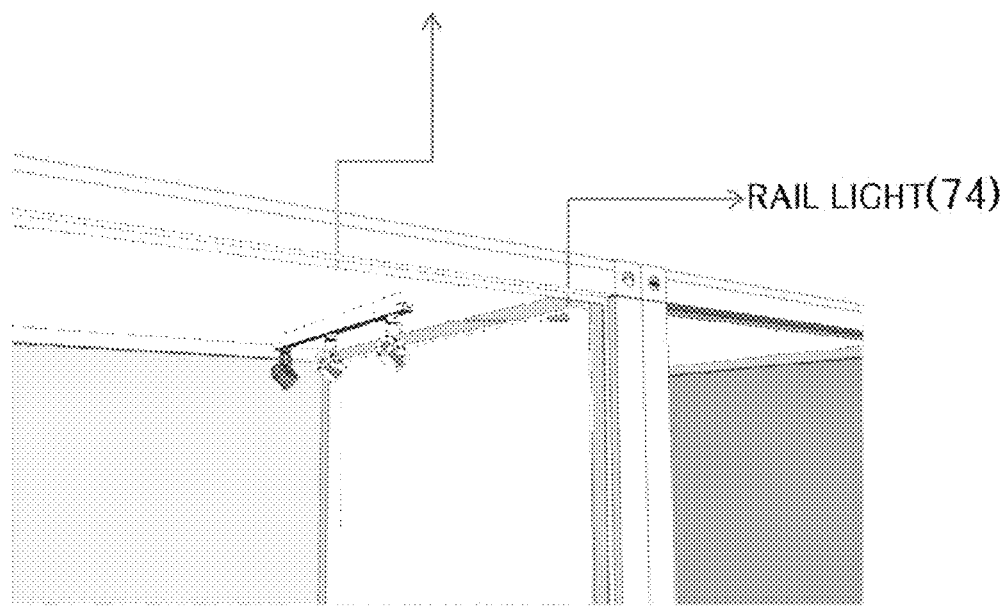
FIG. 23 is a view illustrating a rail light of the unit event module of the system booth according to an embodiment of the present invention.

Also, a bottom surface of the top panel 22 may be formed of a steel plate and a rail light 74 fastened to the steel plate of the top panel 22 may be provided. The rail light 74, as shown in FIG. 23, may be fastened to the steel plate of the top panel 22 by a magnetic light panel 75. As described above, the top panel 22 is formed of the steel plate and the magnetic light panel 75 is used, thereby freely installing or detaching the rail light 74. Accordingly, when installing the unit event module 11 to hold an exhibition or an event, the rail light 74 is installed on a desired location by using the magnetic light panel 75 to illuminate the inside. On the contrary, when the exhibition or the event is finished, the magnetic light panel 75 and the rail light 74 are separated from a steel member such as the top panel 22 and stored separately while being transported, thereby stably using the rail light 75 with no damage.

Figure 20:
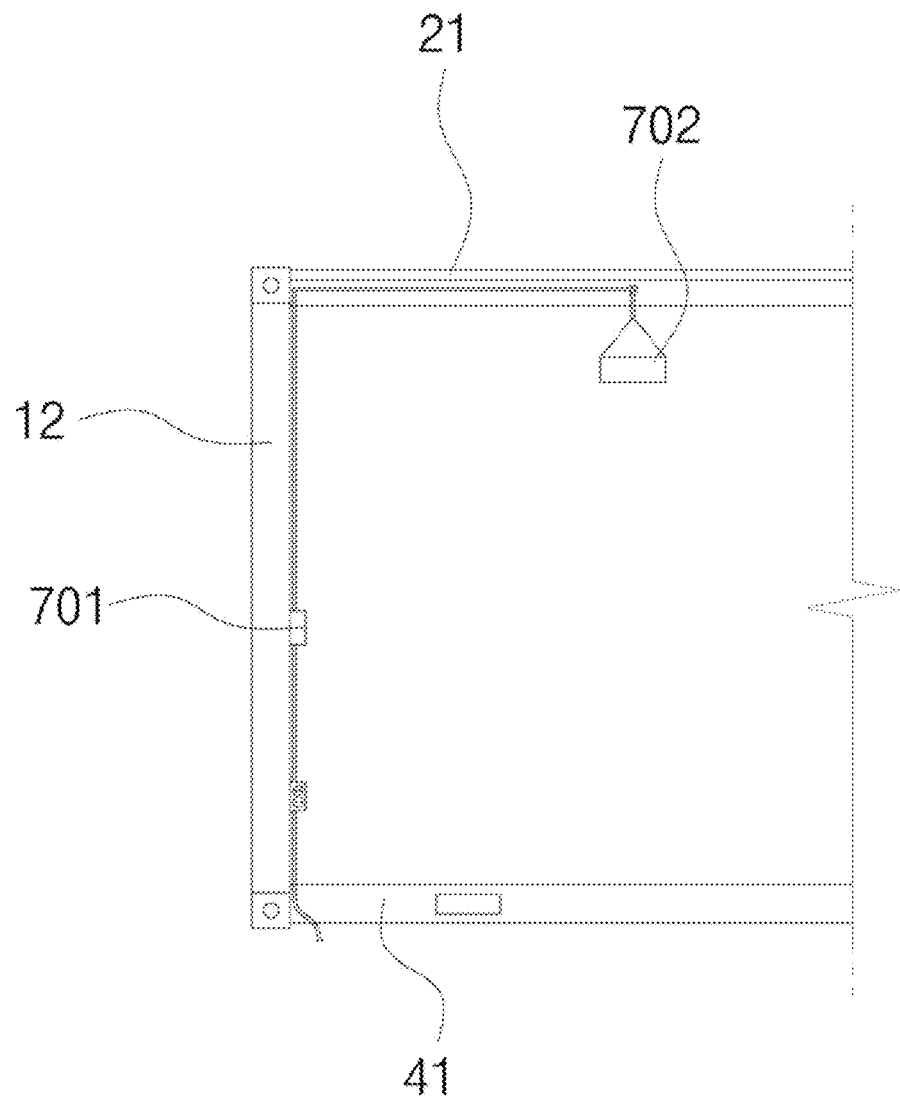
FIG. 20 is a view illustrating an example of an indoor light of the unit event module of the system booth according to an embodiment of the present invention.
Figure 21:
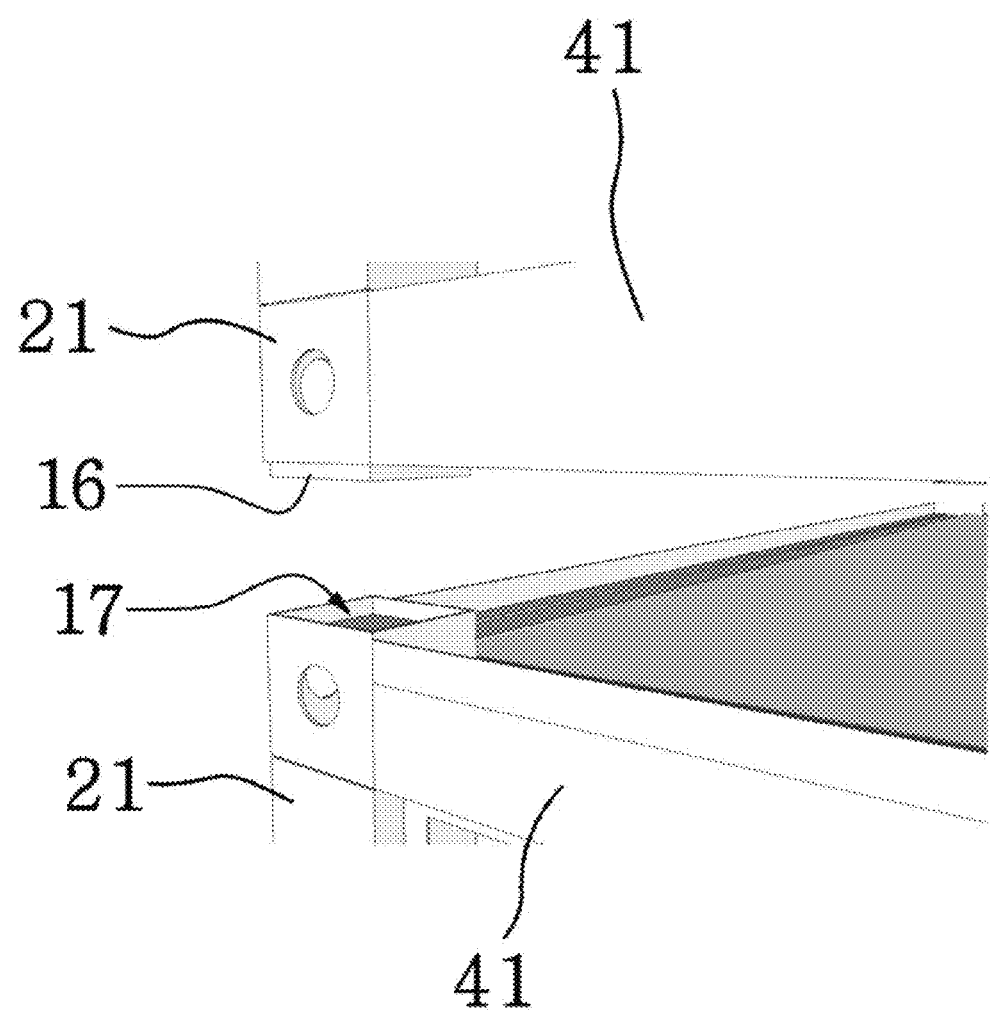
FIG. 21 is an enlarged view illustrating a corner-coupled part of the unit event module of the system booth according to an embodiment of the present invention.
Figure 22:
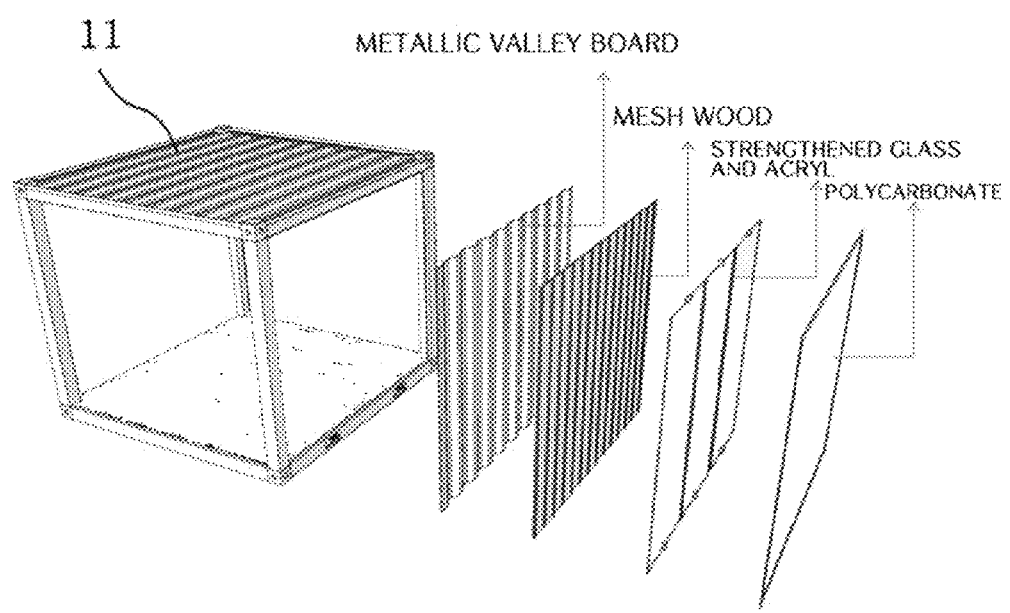
FIG. 22 is a view illustrating panels coupled to the unit event module of the system booth according to an embodiment of the present invention.

Also, as shown in FIG. 20, since a power supply switch 701 is installed on an inner wall of the unit event module 11, and an indoor light 702 tuned on/off by the power supply switch 701 may be installed on a ceiling of the inside. The inside of the unit event module 11 is brightly illuminated by the indoor light 702 together with the rail light 74.

Particularly, the indoor light 702 may illustrate the entire inside of the unit event module 11 and the rail light 74 may intensively illuminate indoor facilities particularly constructed, thereby obtaining an exhibition-lighting effect.

Then, a banner rack 77 fastened to the module support 12 by a magnetic banner panel 76 may be provided.

Figure 24:
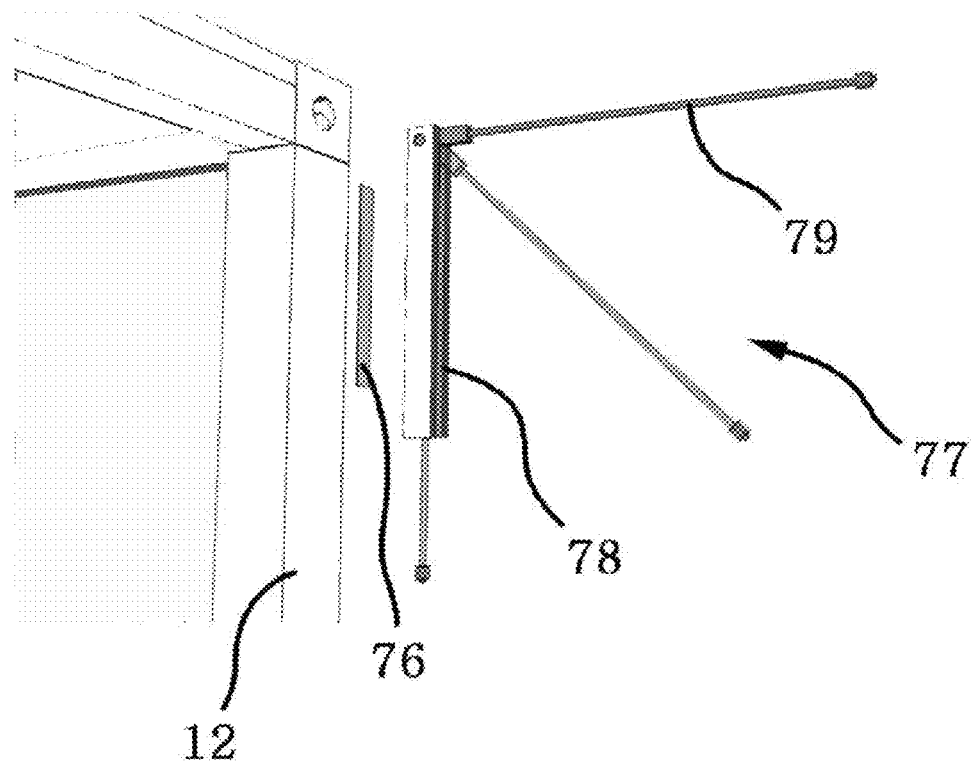
FIG. 24 is a view illustrating a banner rack of the unit event module of the system booth according to an embodiment of the present invention.

The banner rack 77, as shown in FIG. 24, includes a banner rack installation part 78 installed on the module support 12 while being fastened to a magnetic banner panel 76 and a banner rack bar 79 coupled with a top of the banner rack installation part 78 to be rotatable, to which a placard, a banner, or a sign is attached.

Then, a plurality of the unit event modules 11 may be deposited to form the system booth 10. Like this, when the plurality of the unit event modules 11 are deposited to form a plurality of layers, this configuration may be provided to ascend to the upper unit event module 11 or to descend therefrom.

Figure 25:
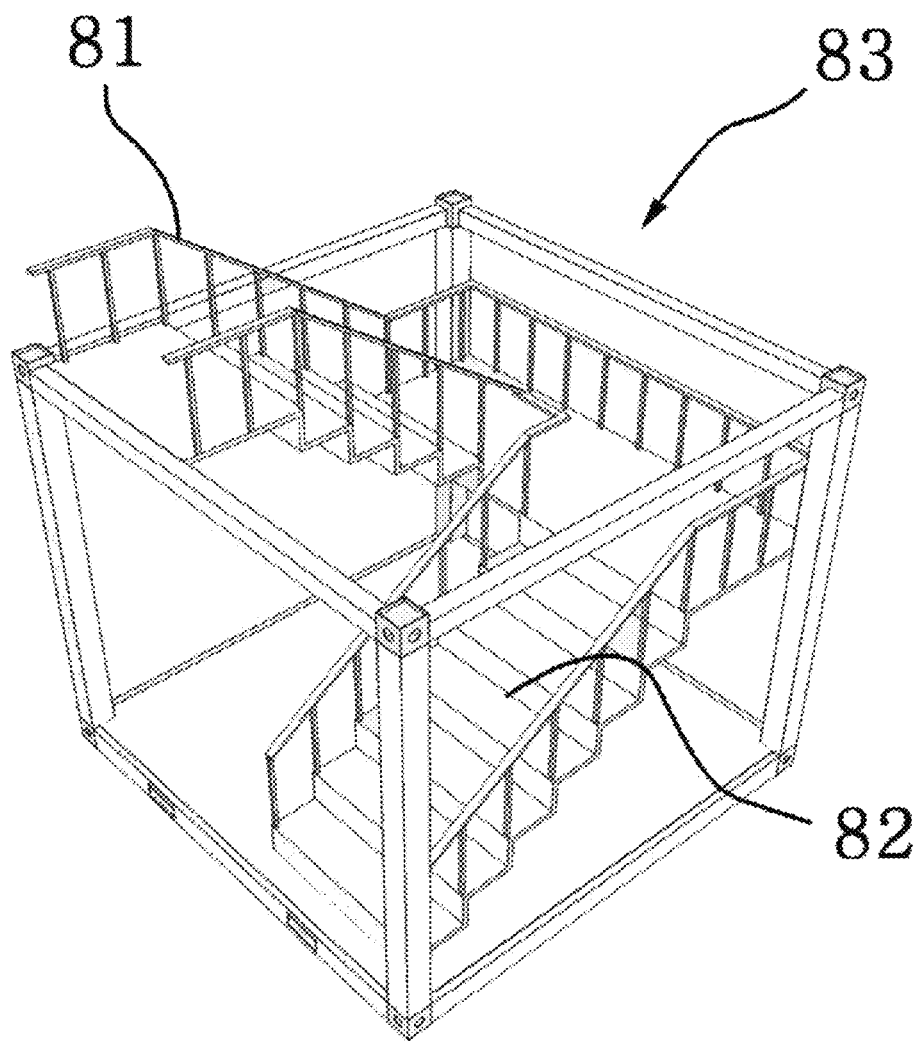
FIG. 25 is a perspective view illustrating a stairway unit event module of the system booth according to an embodiment of the present invention.
Figure 26:
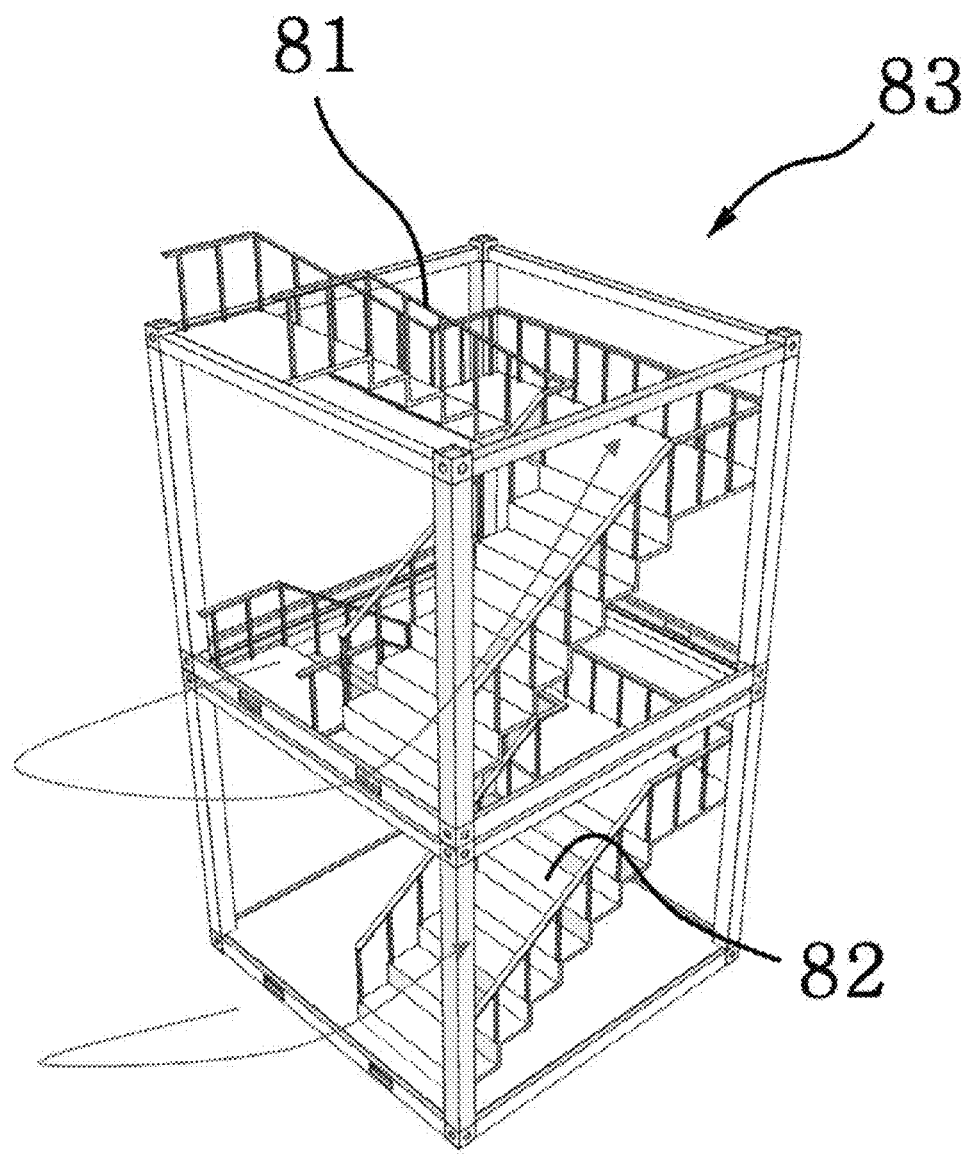
FIG. 26 is a perspective view illustrating a duplex stairway unit event module of the system booth according to an embodiment of the present invention.

For this, as shown in FIGS. 25 and 26, to allow ascending-and-descending to and from the upper unit event module 11 forming the plurality of layers, a step unit event module 83 including a pair of handrails 81 and a plurality of step-bars 82 installed may be provided.

Figure 27:
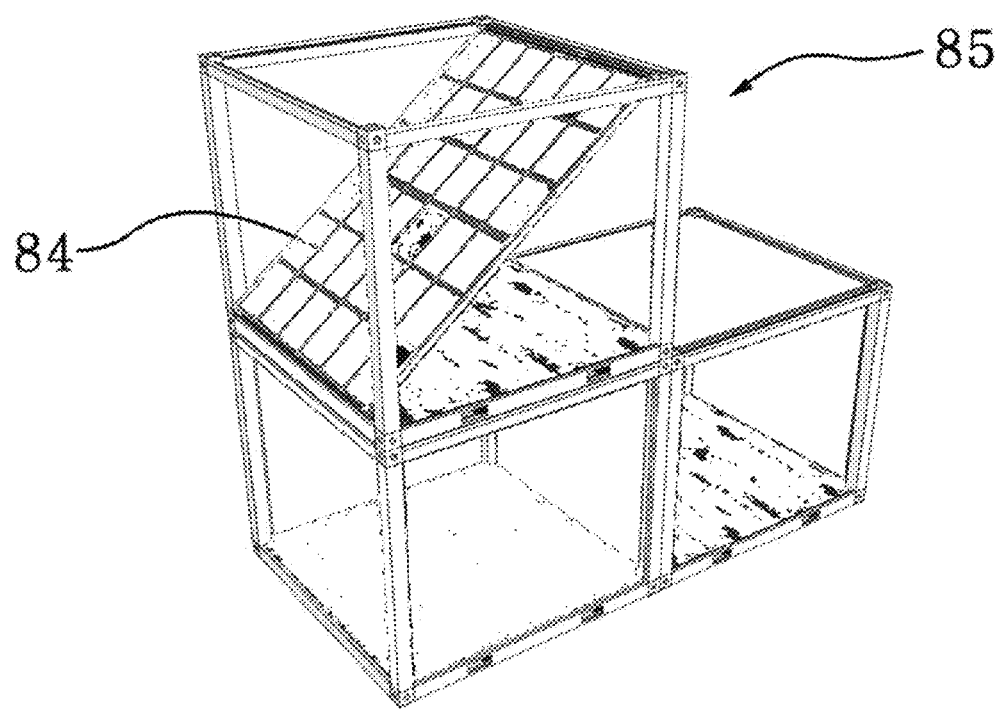
FIG. 27 is a perspective view illustrating a solar cell unit event module of the system booth according to an embodiment of the present invention.

Also, when the unit event module 11 is installed outdoors, solar energy may be used when it is difficult to supply power outdoors or when it is necessary to reduce external power supply. As shown in FIG. 27, a solar cell unit event module 85 with a solar cell plate 84 slantly installed inside may be provided. Accordingly, power generated by the solar cell plate 84 may be used to operate facilities in addition to holding an exhibition or an event.

In addition thereto, when a solar-heating plate unit event module with a solar-heating plate installed instead of the solar cell plate is provided, it is possible to use solar heat energy to heat the inside of the unit event module 11 and to allow using hot water.

In the container type system booth 10 for holding an indoor/outdoor exhibition as described above, the plurality of the unit event modules 11 may be used as various forms such as an exhibition holding system booth and an event holding system booth depending on a way of depositing or arranging the plurality of the unit event modules 11 and additional facilities installed indoors/outdoors.

Figure 28:
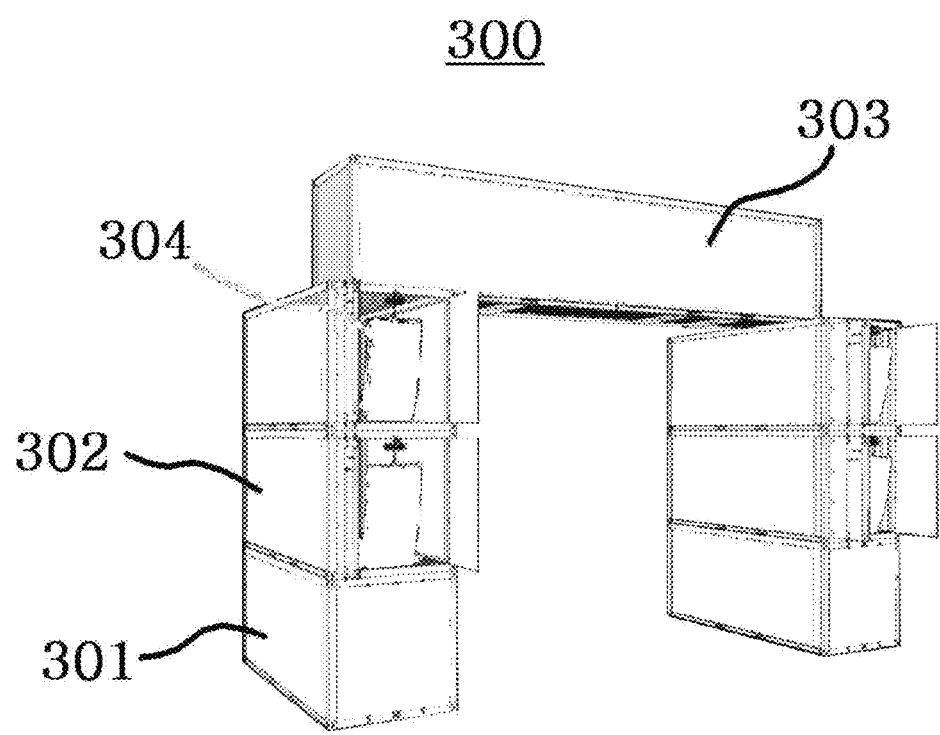
FIG. 28 is a perspective view illustrating a stage system booth of the system booth according to an embodiment of the present invention.

Hereupon, in an example of installing as acoustics, as shown in FIG. 28, a stage system booth 300 may be provided, the stage system booth 300 including stage support unit event modules 301 forming a stage support unit booth functioning as supports on both sides, speaker unit event modules 302 with stage speakers 304 installed inside, forming a speaker unit booth, and light unit event modules 303 with lights installed inside, forming a light unit booth.

According to the stage system booth 300 provided as described above, a sound of music flows from the stage speaker 304 installed in the speaker unit event module 302 located above the stage support unit event module 301 and the light and stage settings (not shown) installed in the light unit event module 303 are operated, thereby holding a music concert or various events.

The stage support unit event module 301, the speaker unit event module 302, and the light unit event module 303 that are respective members of the stage system booth 300 are previously manufactured, transported to a place for holding an event, assembled, and easily installed. Accordingly, when holding the event, since an additional stage installation process is less necessary, only the respective unit event modules 11 are simply transported and installed, thereby reducing the entire time for installation.

In addition, since the stage support unit event module 301, the speaker unit event module 302, and the light unit event module 303 are separated and transported, respectively, when being transported to hold the event in another place or being stored after the event is finished, it is easy not only to be installed but to be transported and stored.

Figure 29:
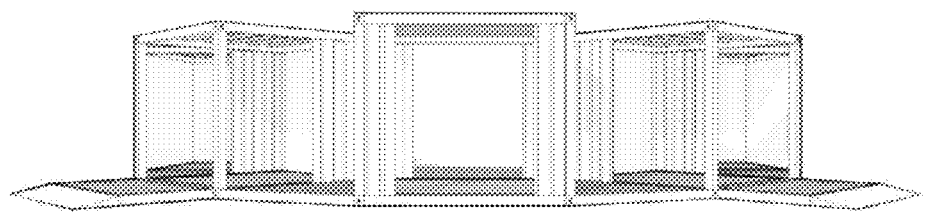
FIG. 29 is a perspective view illustrating a radial system booth of the system booth according to an embodiment of the present invention.

Next, as shown in FIG. 29, a radial system booth 310 may be provided, in which a plurality of the unit event modules 11 is radially arranged and installed while being in contact with adjacent one another. The respective unit event modules 11 face several directions in the radial system booth 310 to allow users use facilities in the several directions, which may be generally installed in the center of an exhibition place or an event place.

Figure 30:
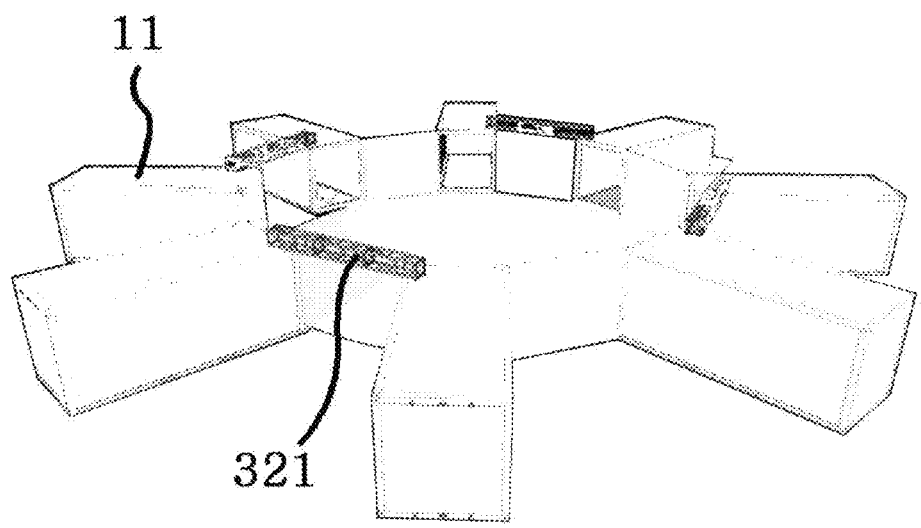
FIG. 30 is a is a perspective view illustrating a blooming system booth of the system booth according to an embodiment of the present invention.

Then, as shown in FIG. 30, a blooming system booth 320 may be provided, in which a plurality of the unit event modules 11 is radially arranged while being separated from adjacent one another and being connected by upper support members 321.

When installing the blooming system booth 320, a stage space, an exhibition space, and a working space is formed in the center, the plurality of the unit event modules 11 being arranged outward around the center.

Figure 31:
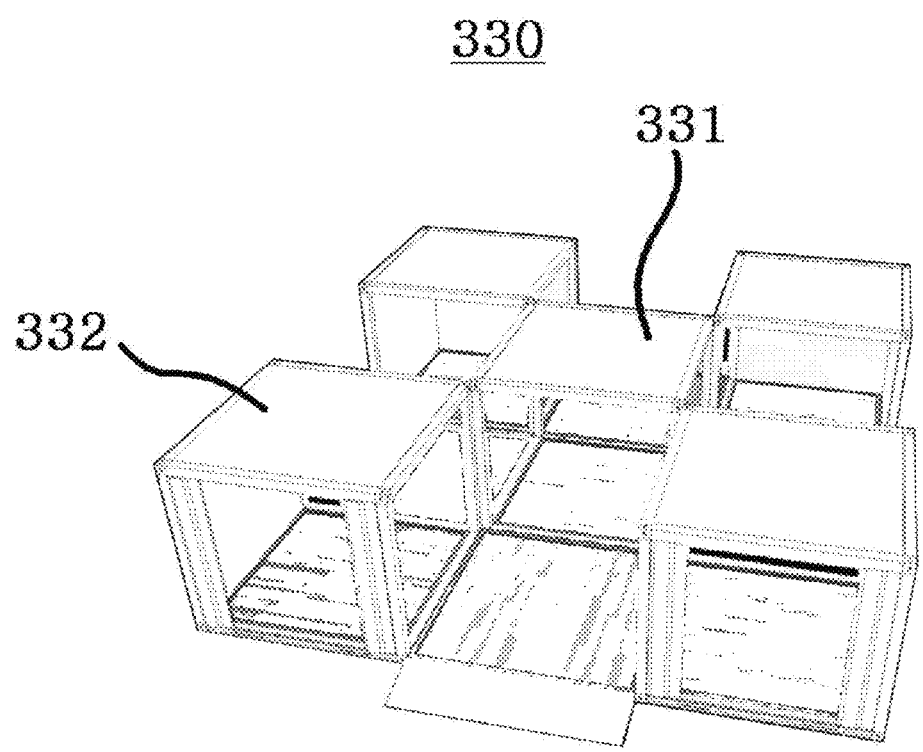
FIG. 31 is a perspective view illustrating a cubic system booth of the system booth according to an embodiment of the present invention.

Also, as shown in FIG. 31, a cubic system booth 330 may be provided, in which a center unit event module 331 is located in the center and outer unit event modules 332 are located while being in contact with four corners of the center unit event module 331.

In the cubic system booth 330, the center unit event module 331 may be used as one of a main exhibition/event place and an administration module and the outer unit event modules 332 may be used as facilities to hold an exhibition or an event.

Figure 32:
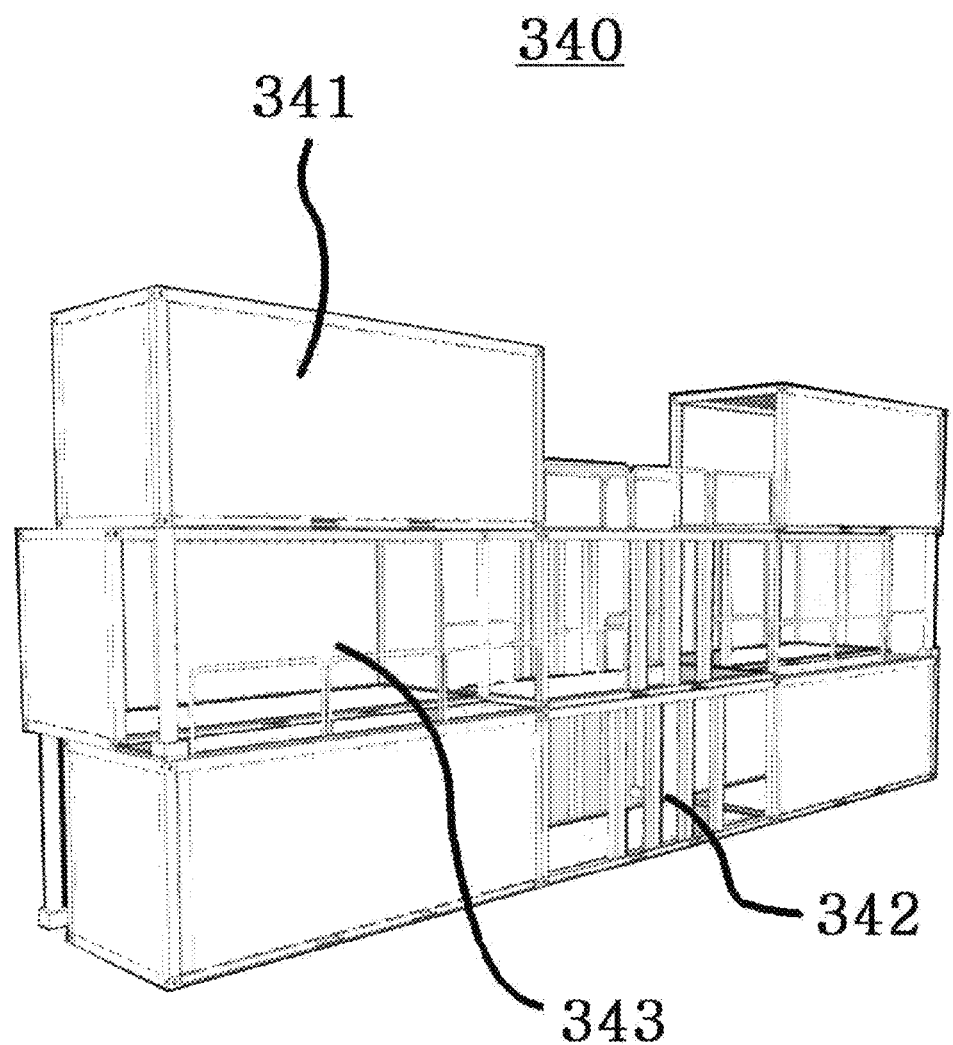
FIG. 32 is a perspective view illustrating a stack system booth of the system booth according to an embodiment of the present invention.

Then, as shown in FIG. 32, a stack system booth 340 may be provided, in which unit event modules 341 are installed on both sides of a top part and both sides of a bottom part, respectively, passage unit event modules 342 are installed in the centers of the top and the bottom, and terrace unit event modules 343 with open fronts are installed on an intermediate layer.

According to the stack system booth 340, an exhibition or an event may be held in the unit event modules 341 and users may pass through the passage unit event modules 342 formed in a two-storied structure. In addition thereto, in the stack system booth 340, users may enjoy drinks or have talks and decorations or garden plants helpful for the exhibition or the event may be installed in the terrace unit event modules 343, which may be used as places where the users may be relaxed while holding the exhibition or the event.

Figure 33:
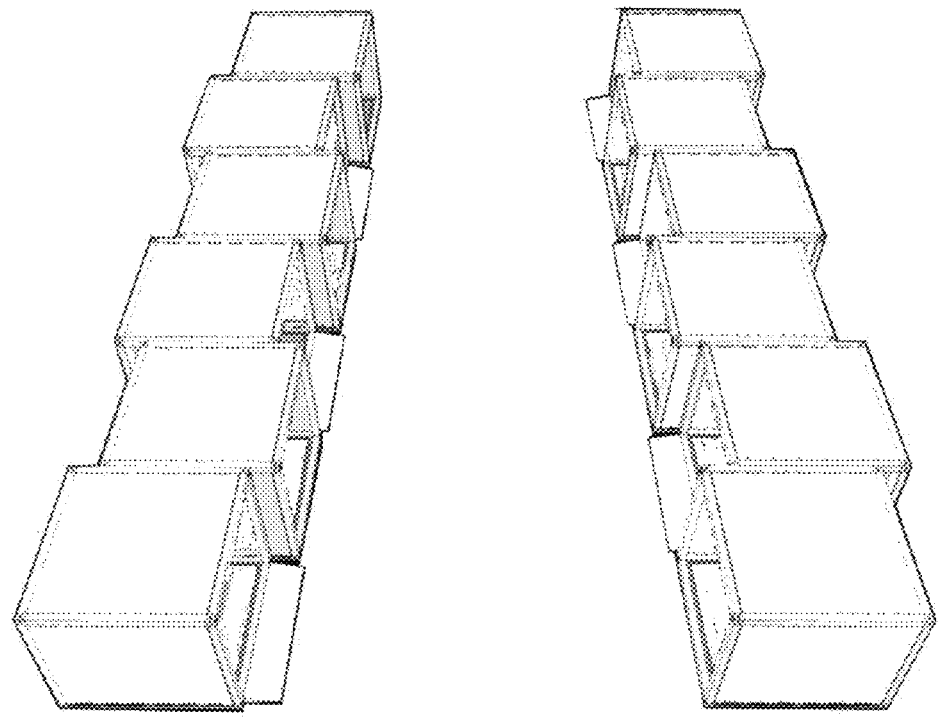
FIG. 33 is a perspective view illustrating a parallel system booth of the system booth according to an embodiment of the present invention.

In addition thereto, as shown in FIG. 33, a parallel system booth 350 may be provided, in which the unit event modules 11 are entirely arranged in two rows and the respective unit event modules 11 are alternately arranged in a series of zigzags in each row.

In the parallel system booth 350, the entire unit event modules 11 are arranged in the two rows in order to be used when the entire exhibition space or event space is provided lengthwise or divided into small groups formed lengthwise.

Hereupon, in the arrangement of the unit event modules 11 of the each row, the respective unit event modules 11 may have open parts opposite to the adjacent module or may be provided in a series of zigzags.

Accordingly, in both directions of the each row, the users may watch or may join in the exhibition or the event.

Figure 34:
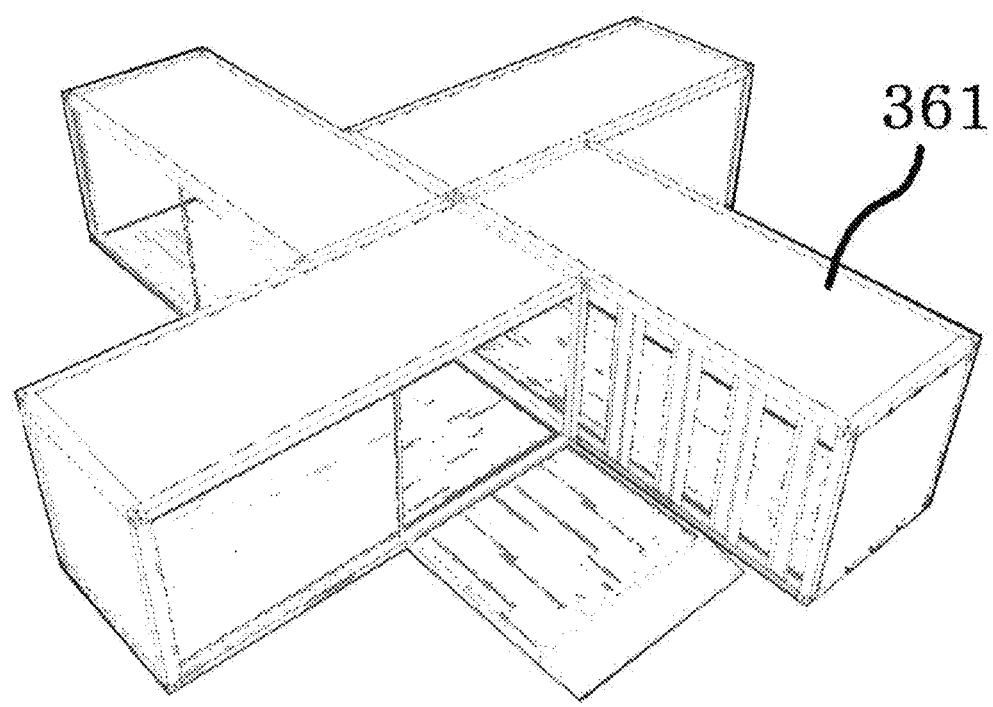
FIG. 34 is a perspective view illustrating a pinwheel system booth of the system booth according to an embodiment of the present invention.

Next, as shown in FIG. 34, a pinwheel system booth 360 may be provided, in which four wing unit event modules 361 are installed to be in contact with one another at each side thereof in such a way that the entire shape becomes a pinwheel.

In the pinwheel system booth 360, the four wing unit event modules 361 are arranged as wings are spread in four directions, respectively, a central space is covered at top, which is capable of being used as a central lobby, and it is possible to individually hold separate exhibitions or events at sides of the respective wing unit event modules 361.

Figure 35:
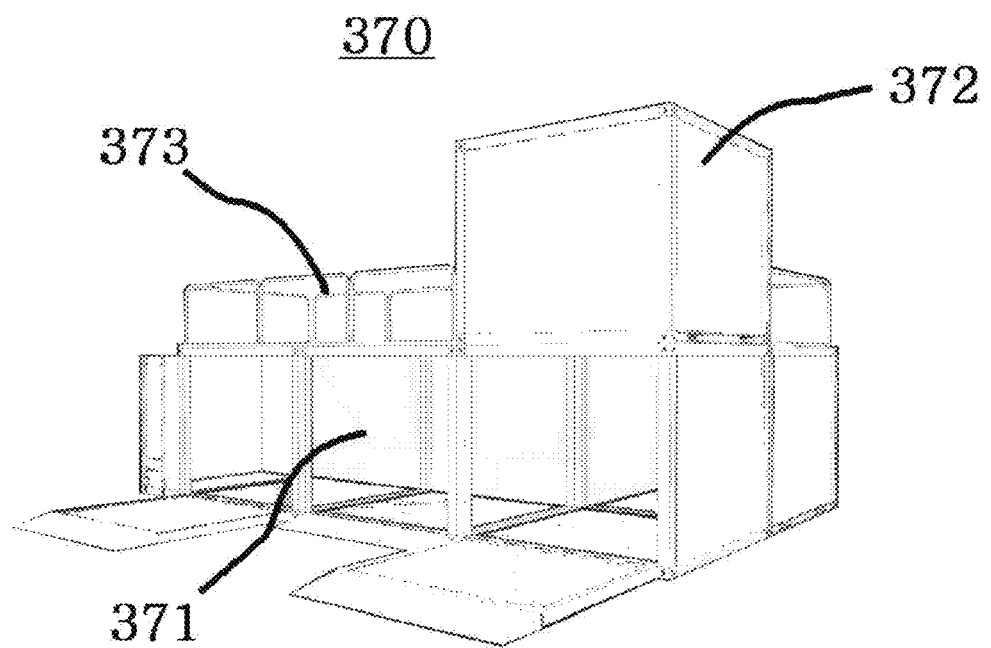
FIG. 35 is a perspective view illustrating a duplex-floor system booth of the system booth according to an embodiment of the present invention.
Figure 36:
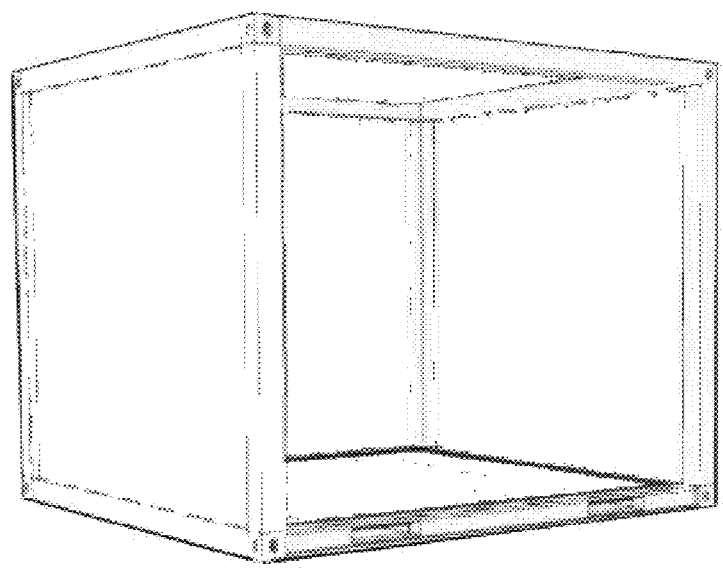
FIG. 36 is a perspective view illustrating a small unit event module of the system booth according to an embodiment of the present invention.

Also, as shown in FIG. 35, a duplex floor system booth 370 may be provided, in which exhibition unit event modules 371 with an open front are installed at a bottom, a container unit event module 372 is installed on one side above the exhibition unit event module 371, and terrace unit event modules 373 are installed.

According to the duplex floor system booth 370, the exhibition unit event modules 371 may be a space for allowing the users to pass through while checking a simple guide or guides for the entire exhibition or event. Then, the container unit event module 372 may be used to hold an indoor exhibition or event and the terrace unit event modules 373 may be used as a space to relax to allow enjoying simple drinks or taking a rest.

Figure 37:
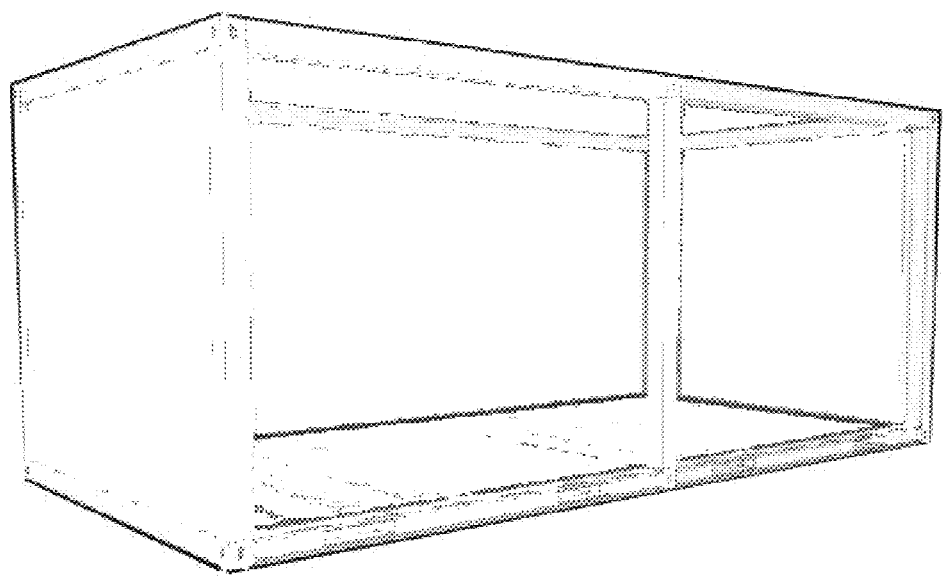
FIG. 37 is a perspective view illustrating a medium unit event module of the system booth according to an embodiment of the present invention.
Figure 38:
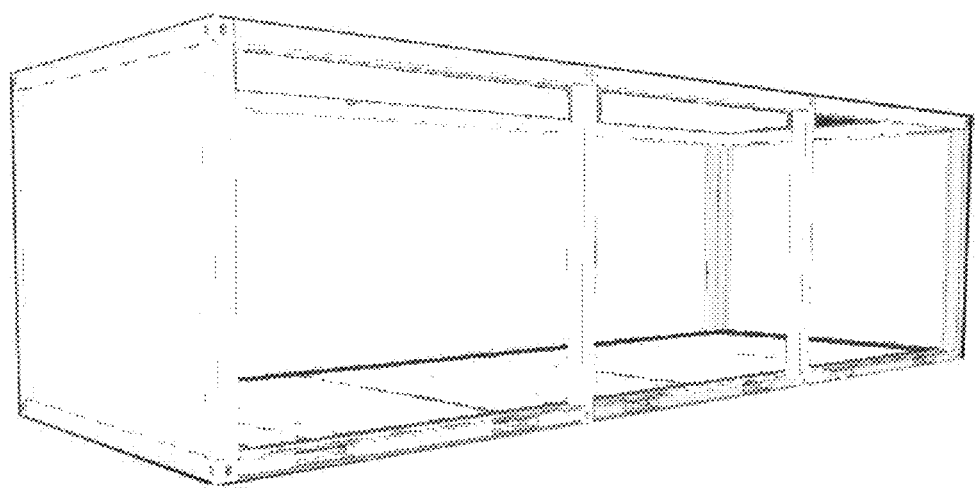
FIG. 38 is a perspective view illustrating a large unit event module of the system booth according to an embodiment of the present invention.

The system booth 10 as described above, as shown in FIG. 36, may be provided as being with a single unit event module 11 that is a simple and has a small size. Also, as shown in FIG. 37, the system booth 10 may be provided to have an intermediate size. Furthermore, as shown in FIG. 38, the system booth 10 may be provided to have a long size.

Figure 39:
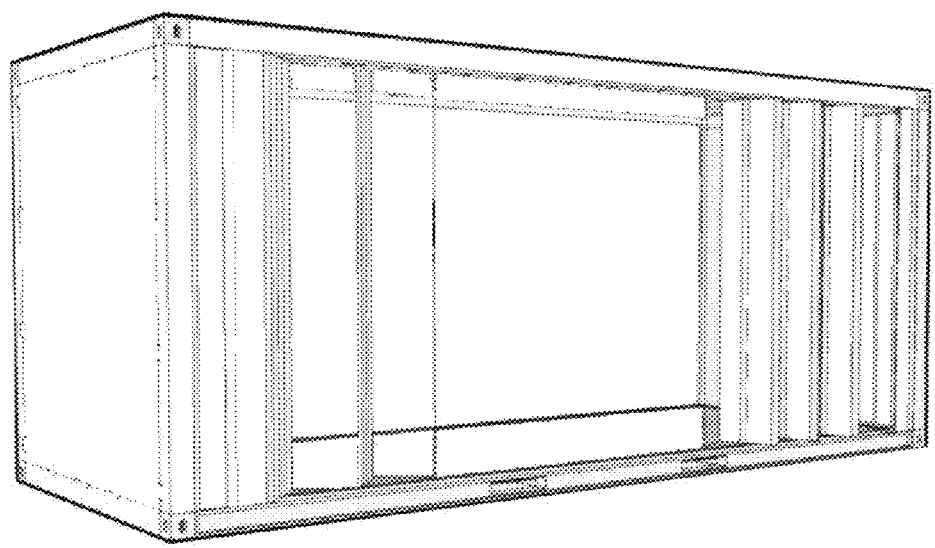
FIG. 39 is a perspective view illustrating a sliding door installed-unit event module of the system booth according to an embodiment of the present invention.
Figure 40:
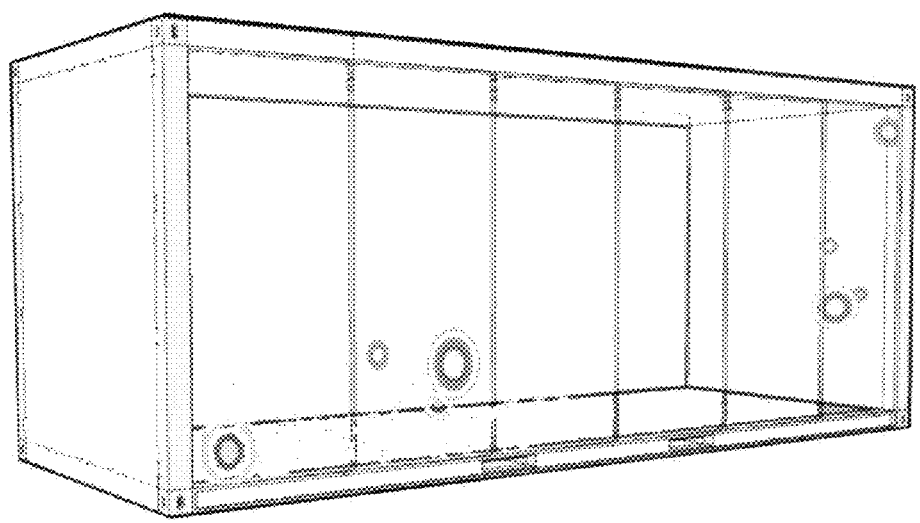
FIG. 40 is a perspective view illustrating a transparent frontal glass installed-unit event module of the system booth according to an embodiment of the present invention.

Also, as shown in FIGS. 39 and 40, when a front is formed of a single body of glass or formed of glass, an entrance formed of glass may be provided.

Figure 41:
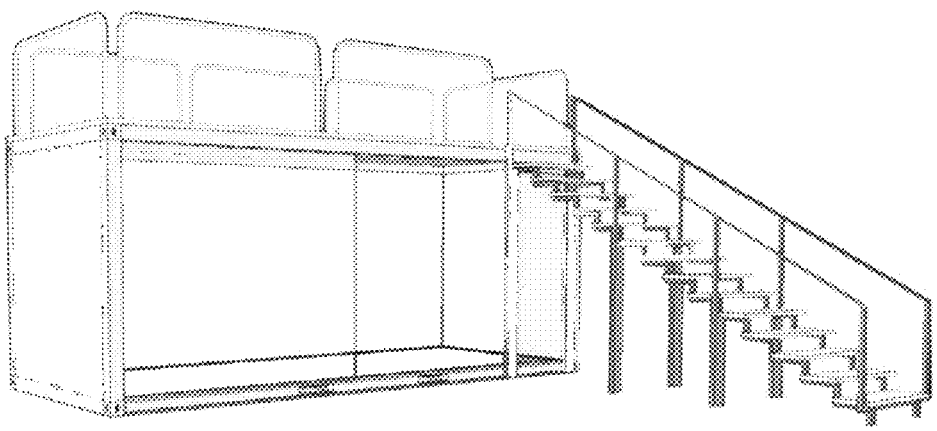
FIG. 41 is a perspective view illustrating a terrace roof type unit event module of the system booth according to an embodiment of the present invention.
Figure 42:
FIG. 42 is a view illustrating the system booth converted into a café according to an embodiment of the present invention.

Also, as shown in FIG. 41, a terrace may be formed above the unit event module 11 and a ladder for ascending upwardly may be provided.

The system booth 10 provided as described above may be used as a space for enjoying drinks, simple foods, and fast foods and as a mobile convenience store as shown in FIGS. 42 to 45.

Particularly, as shown in FIGS. 42 to 45, various types of facilities may be provided indoors and additionally a bench or seating may be provided outdoors.

Figure 43:
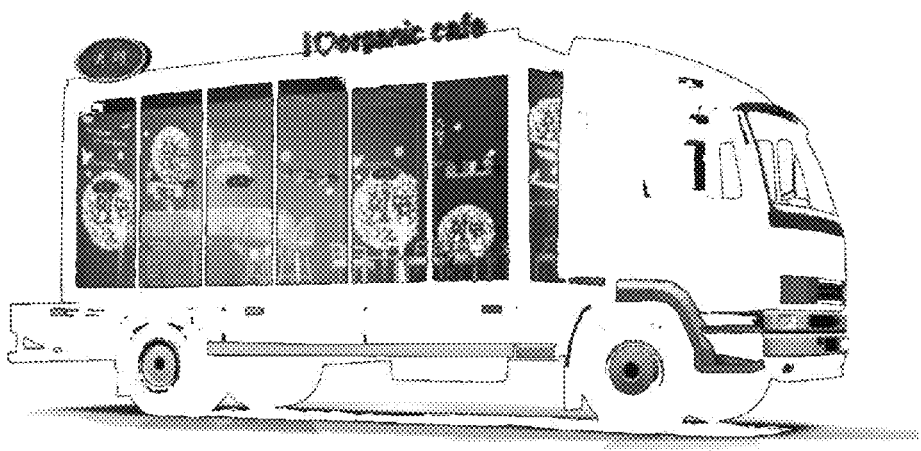
FIG. 43 is a view illustrating the system booth converted into a vehicle-movable café according to an embodiment of the present invention.

The unit event module 11, as shown in FIG. 43, may be used or transported while being mounted on cargo vehicles, capable of being transported and used to and in a desired place. Also, when an exhibition or an event is finished, as shown in FIG. 43, the unit event module 11 may be transported by vehicles and may be used again in another desired place. The unit event module 11 and the system booth 10 using the same, which are capable of being conveniently used, installed, transported, and stored, may be provided.

Figure 44:
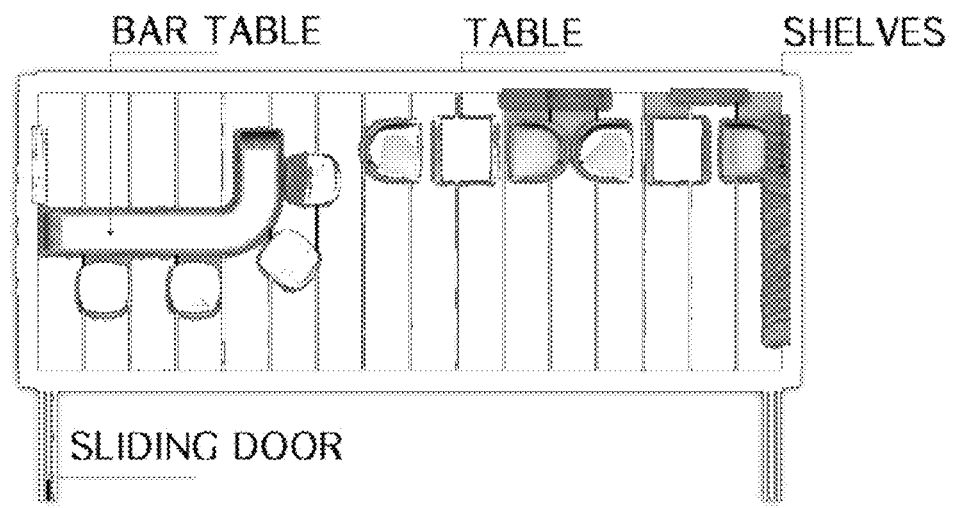
FIG. 44 is a view illustrating an inner configuration of the system booth converted into the café according to an embodiment of the present invention.
Figure 45:
FIG. 45 is a view illustrating an outdoor installation of the system booth converted into the café according to an embodiment of the present invention.

Also, inside each of the unit event module 11, as shown in FIG. 44, a bar table, general tables, shelves, and chairs may be provided. Also, an entrance may be provided as a sliding door to be suitable for a café or a convenient store.

Figure 46:
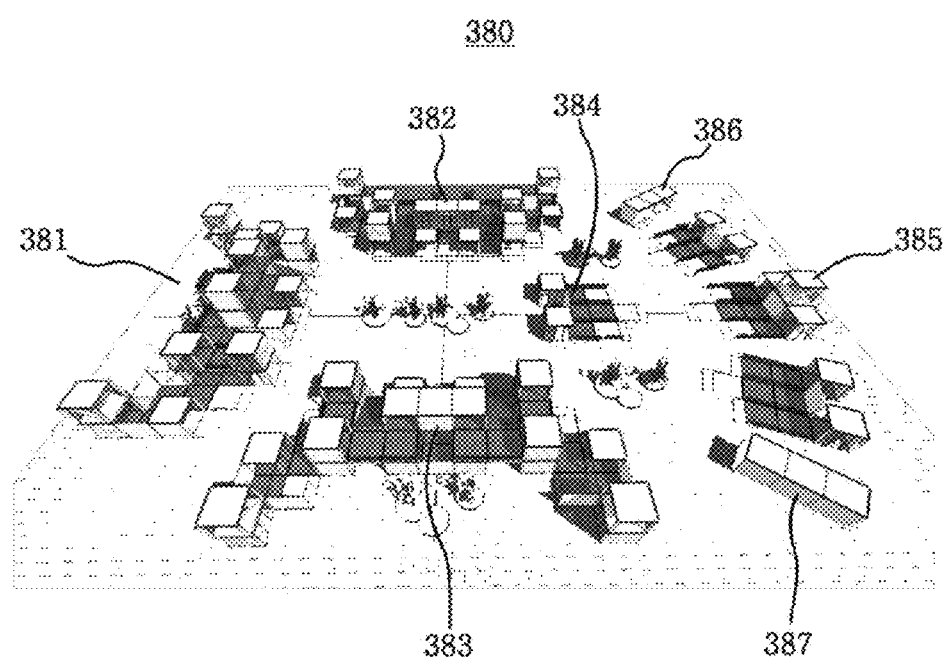
FIG. 46 is a perspective view illustrating a complex space arranged system booth of the system booth according to an embodiment of the present invention.

In addition thereto, as shown in FIG. 46, a system booth having a complex space configuration may be provided, the system booth being formed of at least one or more of the several unit event modules or different respective system booth as described above, which form complex arrangement and totally come together.

That is, a complex space layout system booth 380 may be provided including a main exhibition unit event module 381 for holding a large and weighty exhibition or event of a company that is a main host among companies holding exhibitions or events, provided on one side, a VIP lounge unit event module 382 forming a VIP lounge for VIP guests, a business meeting room, and an office for holding exhibitions or events, provided on one of left and right sides, an event exhibition unit event module 383 forming a stage for an event and various experience facilities, provided on another of the left and right sides, a company exhibition unit event module 385 operated by individual small companies, a cafeteria unit event module 386 to sell drinks, coffee, and foods, a stockroom unit event module 387 for storing goods to be exhibited, which are provided opposite to the main exhibition unit event module 381, and a permanent event unit event module 384 for holding permanent events or taking a rest, provided in the center.

Accordingly, since exhibitions or events may be held while various fields and various companies mix with one another, space efficiency may be maximized.

Figure 47:
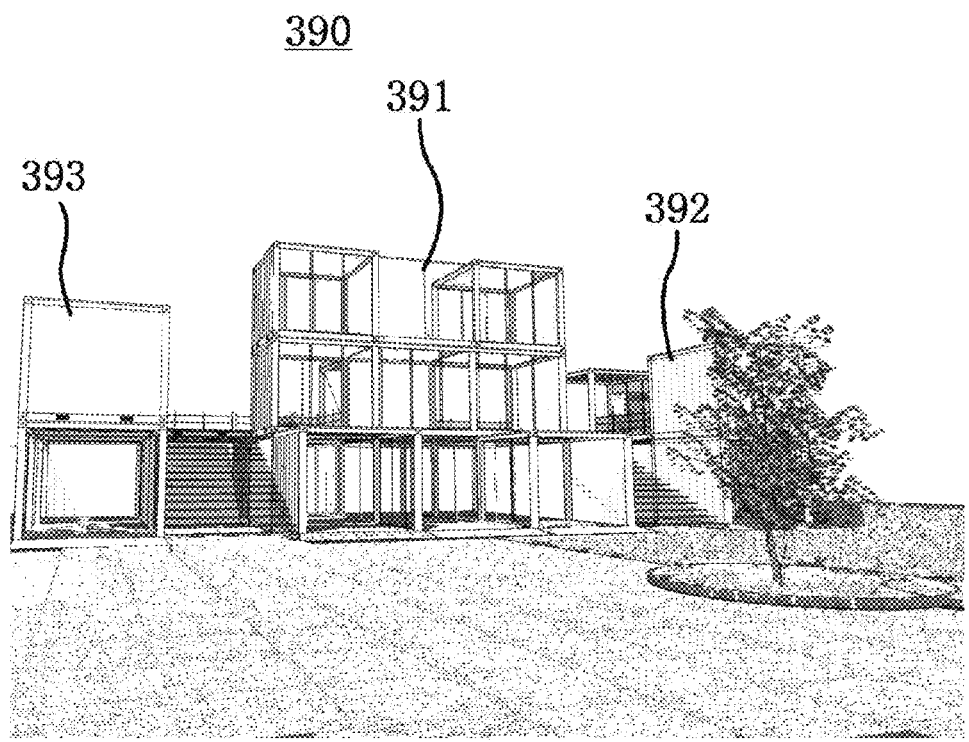
FIG. 47 is a perspective view illustrating a multipurpose exhibition tower system booth of the system booth according to an embodiment of the present invention.

Also, as shown in FIG. 47, an exclusive multipurpose system booth for holding a main exhibition or a main event may be provided.

That is, a multi-purpose display tower system booth 390 may be provided including a VIP tower unit event module 391 forming a plurality of layers for major participating companies, major events, and major meetings to demonstrate main events, provided in the center, with a step unit event module therebetween, a permanent office unit event module 392 provided on one side, including equipments for holding an event and a control room to operate exhibitions and events, and a public-relations (PR) unit event module 393 with introduction materials of exhibition-event participating companies provided to provide guides and information for exhibitions and events, provided on another side.

That is, since the major events are held in the VIP tower unit event module 391, major events and meetings are held diversely and individual unit event modules are held in a multilayered tower, thereby maximizing space efficiency.

Also, since the permanent office unit event module 392 and the PR unit event module 393 supports and guides the exhibitions or events, the exhibitions or events may be usefully held.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

The invention claimed is:

1. A container-type system booth for holding an indoor/outdoor exhibition or event, the container-type system booth comprising a unit event module, wherein the unit event module comprises:
   a tetragonal top frame having four sides provided above four module supports;
   a tetragonal bottom frame having four sides provided below the four module supports;
   a top panel installed toward the inside of the tetragonal top frame and covering a rooftop;
   top strengthening pipes connected to the tetragonal top frame having the four sides and supporting a bottom of the top panel;
   a bottom panel installed toward the inside of the tetragonal bottom frame and forming a bottom surface;
   bottom strengthening pipes connected to the tetragonal bottom frame having the four sides and supporting the bottom panel;
   transportation pipes located between the bottom strengthening pipes and extended frontward and backward;
   the four module supports connecting the tetragonal top frame and the tetragonal bottom frame to one another, wherein the unit event module is installed indoors or outdoors as one or a plurality thereof to be provided as facilities for exhibitions or events;
   a clapboard forming a raised part formed on top edges of the tetragonal top frame;
   a drain for rainwater, formed by forming a groove formed in a longitudinal direction above the tetragonal top frame between the clapboard and edges of the top panel; and
   a rainwater hole for drainage, formed above the module supports in contact with the drain.

2. The container-type system booth of claim 1, comprising:
   a bottom strengthening support frame formed together with the inside of the tetragonal bottom frame as a single body and having a smaller height than the tetragonal bottom frame; and
   a bottom strengthening panel located below the bottom panel installed toward the inside of the tetragonal bottom frame and supported by the bottom strengthening pipes and the bottom strengthening support frame.

3. The container-type system booth of claim 1, comprising a connected-fastened installation member provided at an intersection where a plurality of the unit event modules is coupled and intersects with one another, wherein the connected-fastened installation member comprises:
   pegs formed in an L-shape, inserted into the module support holes formed on the module supports of the plurality of the unit event modules;
   a connected-fastened panel with the pegs fastened, which is formed in the shape of a flat panel to hide the intersection where the plurality of the unit event modules are coupled and intersect with one another; and
   connected-decorative bolts coupled with decorative-bolt-fastened holes formed on the connected-fastened panel, at positions of the module support holes of the plurality of the unit event modules, provided to hide the module support holes.

4. The container-type system booth of claim 1, comprising:
   a ladder installed on an outer side surface of the unit event module, the ladder comprising a pair of handrails, each including an upper end fastened to one of the top surface and a side surface of the tetragonal top frame and a lower end fastened to a side surface of the tetragonal bottom frame, and a plurality of step-bars vertically arranged between the handrails;
   a bottom surface of the top panel being formed of a steel plate, a rail light fastened to the steel plate of the top panel, the rail light being fastened to the steel plate of the top panel by a magnetic light panel; and
   a banner rack fastened to the module support by a magnetic banner panel, the banner rack comprising a banner rack installation part installed on the module support while being fastened to a magnetic banner panel and a banner rack bar coupled with a top of the banner rack installation part to be rotatable, to which a placard, a banner, or a sign is attached.

5. The container-type system booth of claim 1, further comprising, in which a plurality of the unit event modules is deposited and forms a plurality of layers, to allow ascending-and-descending to and from the upper unit event module forming the plurality of layers:
   a step unit event module including a pair of handrails and a plurality of stepbars installed; and
   a solar cell unit event module with a solar cell plate slantly installed inside.

* * * * *